US012439184B2

(12) United States Patent
Park et al.

(10) Patent No.: US 12,439,184 B2
(45) Date of Patent: Oct. 7, 2025

(54) IMAGE SENSOR INCLUDING TIME-DIVISION CONTROLLED CORRELATED DOUBLE SAMPLER AND ELECTRONIC DEVICE INCLUDING THE SAME

(71) Applicant: Samsung Electronics Co., Ltd., Suwon-si (KR)

(72) Inventors: Seokyong Park, Suwon-si (KR); Kyungmin Kim, Suwon-si (KR); Donghyun Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 260 days.

(21) Appl. No.: 18/329,836

(22) Filed: Jun. 6, 2023

(65) Prior Publication Data
US 2024/0022800 A1    Jan. 18, 2024

(30) Foreign Application Priority Data

Jul. 15, 2022   (KR) .................. 10-2022-0087798
Feb. 16, 2023   (KR) .................. 10-2023-0020816

(51) Int. Cl.
*H04N 25/78*     (2023.01)
*H04N 25/585*    (2023.01)
*H04N 25/59*     (2023.01)
*H04N 25/616*    (2023.01)
*H04N 25/778*    (2023.01)

(52) U.S. Cl.
CPC .......... *H04N 25/78* (2023.01); *H04N 25/585* (2023.01); *H04N 25/59* (2023.01); *H04N 25/616* (2023.01); *H04N 25/778* (2023.01)

(58) Field of Classification Search
CPC ...... H04N 25/78; H04N 25/585; H04N 25/59; H04N 25/616; H04N 25/778
See application file for complete search history.

(56) References Cited

U.S. PATENT DOCUMENTS

| 9,728,565 B2 | 8/2017 | Fossum et al. |
| 9,967,505 B1 | 5/2018 | Ebihara |
| 10,615,190 B2 | 4/2020 | Ebihara |
| 2016/0198108 A1 | 7/2016 | Guidash et al. |

(Continued)

OTHER PUBLICATIONS

Extended European Search Report dated Oct. 16, 2023 issued in European Patent Application No. 23185498.5.

*Primary Examiner* — Nicholas G Giles
(74) *Attorney, Agent, or Firm* — Harness, Dickey & Pierce, P.L.C.

(57) ABSTRACT

An image sensor includes a pixel array including a first pixel connected to a first column line and a second pixel connected to a second column line, each of the first pixel and the second pixel including a first photodiode (PD) and a second PD, which share a driving transistor, are configured to operate in a first mode and a second mode according to a conversion gain based on the first PD, and are configured to operate in a third mode and a fourth mode based on the second PD; and an analog-to-digital converter including a first correlated double sampling (CDS) circuit, a second CDS circuit, and a third CDS circuit, which read pixel signals output through the first column line and the second column line. The first CDS circuit is connected to the first column line and the second column line in a time-division manner.

18 Claims, 27 Drawing Sheets

(56) References Cited

U.S. PATENT DOCUMENTS

| | | |
|---|---|---|
| 2019/0075261 A1 | 3/2019 | Machida et al. |
| 2019/0124278 A1 | 4/2019 | Velichko |
| 2019/0273879 A1 | 9/2019 | Xu et al. |
| 2020/0137325 A1 | 4/2020 | Mori et al. |
| 2020/0204751 A1* | 6/2020 | Lule .................... H04N 25/771 |
| 2024/0114266 A1* | 4/2024 | Yang .................... H04N 23/55 |

* cited by examiner

IMAGE SENSOR INCLUDING TIME-DIVISION CONTROLLED CORRELATED DOUBLE SAMPLER AND ELECTRONIC DEVICE INCLUDING THE SAME

CROSS-REFERENCE TO RELATED APPLICATION

This application is based on and claims priority under 35 U.S.C. § 119 to Korean Patent Application Nos. 10-2022-0087798, filed on Jul. 15, 2022, and 10-2023-0020816, filed on Feb. 16, 2023, in the Korean Intellectual Property Office, the disclosures of which are incorporated by reference herein in their entirety.

BACKGROUND

Various example embodiments relate to an image sensor, and more particularly, to an image sensor providing an image with an extended dynamic range and high quality, and/or an electronic device including the image sensor.

An image sensor is or includes a device that captures a two-dimensional and/or three-dimensional image of an object. The image sensor generates an image of an object using a photoelectric conversion element that reacts according to the intensity of light reflected from the object. With the development of complementary metal-oxide semiconductor (CMOS) technology, CMOS image sensors using CMOS are widely used. Recently, as image sensors are installed in various devices, an image sensor having improved characteristics of a high dynamic range (HDR) and/or a signal-to-noise ratio (SNR) under low and high illuminance is required or desired.

SUMMARY

Various example embodiments provide an image sensor including a pixel, which includes a plurality of photoelectric conversion elements sharing a driving transistor and supports dual conversion gain mode, and generating image data with high dynamic range and improved signal-to-noise ratio, and an electronic device including the image sensor.

According to some example embodiments, there is provided an image sensor comprising a pixel array including a first pixel connected to a first column line and a second pixel connected to a second column line, each of the first pixel and the second pixel including a first photodiode (PD) and a second PD, which share a driving transistor, the first and second pixels configured to operate in a first mode and a second mode according to a conversion gain based on the respective first PD, and the first and second pixels configured to operate in a third mode and a fourth mode based on the respective second PD, and an analog-to-digital converter including a first correlated double sampling (CDS) circuit, a second CDS circuit, and a third CDS circuit, which are configured to read pixel signals output through the first column line and the second column line. The first CDS circuit is configured to connect to the first column line and the second column line in a time-division manner.

Alternatively or additionally, according to some example embodiments, there is provided an image sensor comprising a pixel array including a plurality of pixels, a plurality of row lines configured to provide control signals to the plurality of pixels, and a plurality of column lines configured to output a plurality of pixel signals generated from the plurality of pixels, each of the plurality of pixels including a first photodiode (PD) and a second PD sharing a driving transistor, an analog-to-digital converter configured to convert a plurality of pixel signals output through the column lines, the analog-to-digital converter including a first correlated double sampling (CDS) circuit, a second CDS circuit, and a third CDS circuit, which are configured to read pixel signals received through a first column line and through a second column line that are among the plurality of column lines, and a switching circuit configured to time-divisionally connect the first column line to the first CDS circuit and the second CDS circuit and connect the second column line to the third CDS circuit in a first period, and to time-divisionally connect the second column line to the first CDS circuit and the second CDS circuit and connect the first column line to the third CDS circuit in a second period.

Alternatively or additionally, according to some example embodiments, there is provided an electronic device comprising a pixel array including a plurality of pixels, a plurality of row lines configured to provide control signals to the plurality of pixels, and a plurality of column lines configured to output a plurality of pixel signals generated from the plurality of pixels, each of the plurality of pixels including a first photodiode (PD) and a second PD sharing a driving transistor, an analog-to-digital converter configured to convert a plurality of pixel signals output through the column lines, the analog-to-digital converter including a first correlated double sampling (CDS) circuit, a second CDS circuit, and a third CDS circuit, which are configured to read pixel signals received through a first column line and through a second column line that are among the plurality of column lines, and a switching circuit configured to time-divisionally connect the first column line to the first CDS circuit and the second CDS circuit and connect the second column line to the third CDS circuit in a first period, and to time-divisionally connect the second column line to the first CDS circuit and the second CDS circuit and connect the first column line to the third CDS circuit in a second period.

BRIEF DESCRIPTION OF THE DRAWINGS

Various example embodiments will be more clearly understood from the following detailed description taken in conjunction with the accompanying drawings in which.

DETAILED DESCRIPTION OF VARIOUS EXAMPLE EMBODIMENTS

Hereinafter, various example embodiments will be described in detail with reference to the accompanying drawings.

Figure 1:
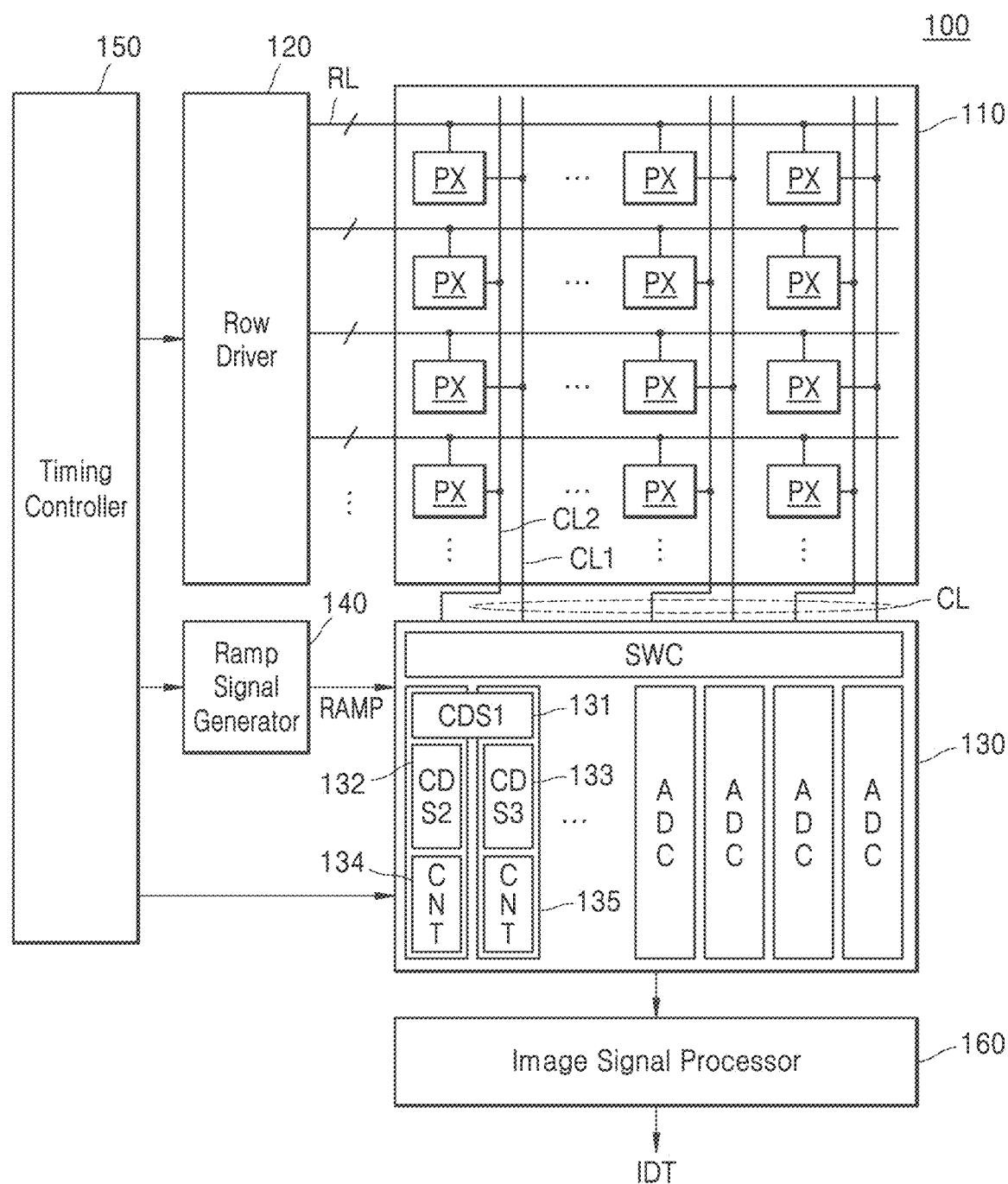
FIG. 1 is a block diagram of an image sensor according to various example embodiments.

FIG. 1 is a block diagram of an image sensor 100 according to various example embodiments.

The image sensor 100 may be mounted on an electronic device having an image and/or light sensing function. For example, image sensors 100 may be mounted on electronic devices, such as one or more of cameras, smart phones, wearable devices, Internet of Things (IoT) devices, home appliances, tablet personal computers (PC), personal digital assistants (PDA), portable multimedia players (PMP), navigation systems, drones, and advanced drivers assistance systems (ADAS). In addition, the image sensor 100 may be mounted on electronic devices provided as components in one or more of vehicles, furniture, manufacturing facilities, doors, various measuring devices, and the like.

Referring to FIG. 1, the image sensor 100 may include a pixel array 110, a row driver 120, an analog-to-digital conversion circuit 130 (hereinafter, referred to as an ADC circuit), a ramp signal generator 140, a timing controller 150, and an image signal processor 160. The row driver 120, the ADC circuit 130, the ramp signal generator 140, and the timing controller 150 may be referred to as a readout circuit.

The pixel array 110 includes a plurality of row lines RL, a plurality of column lines CL, and a plurality of pixels PX connected to the plurality of row lines RL and the plurality of column lines CL and arranged in rows and columns. The plurality of pixels PX may be an active pixel sensor (APS). A number of the plurality of row lines RL may be the same as, greater than, or less than a number of the plurality of column lines CL.

In various example embodiments, pixels PXs arranged in the same column may be connected to a plurality of column lines CL. For example, pixels PXs arranged in the same column may be alternately connected to two column lines, e.g., a first column line CL1 and a second column line CL2.

However, example embodiments are not limited thereto, and pixels PXs arranged in the same column may be connected to the same column line CL.

Each of the plurality of pixels PX may sense light by using a photoelectric conversion element and output an image signal that is an electrical signal according to the sensed light. The photoelectric conversion element may be or may include a photo-sensing element including an organic or inorganic material, such as one or more of a photodiode (inorganic photodiode), an organic photo film, a perovskite photodiode, a phototransistor, a photogate, or a pinned photodiode. Hereinafter, a photodiode will be described as an example of the photoelectric conversion element; however, example embodiments are not limited thereto.

A microlens for condensing light may be disposed above each of the plurality of pixels PX or above each of pixel groups composed of adjacent pixels PX. A color filter for transmitting light in a certain spectral region may be disposed above each of the plurality of pixels PX, and each of the plurality of pixels PX may sense light in the certain spectral region from light received through a microlens based on a corresponding color filter. For example, the pixel array 110 may include red pixels for converting light in a red spectral region into electrical signals, green pixels for converting light in a green spectral region into electrical signals, and blue pixels for converting light in a blue spectral region into electrical signals. However, example embodiments are not limited thereto, and the pixel array 110 may further include white pixels, or the pixel array 110 may include pixels according to other color combinations, such as cyan pixels, yellow pixels, green pixels, and magenta pixels. The pixels PX may be arranged in a Bayer pattern; however, example embodiments are not limited thereto.

Figure 2A:
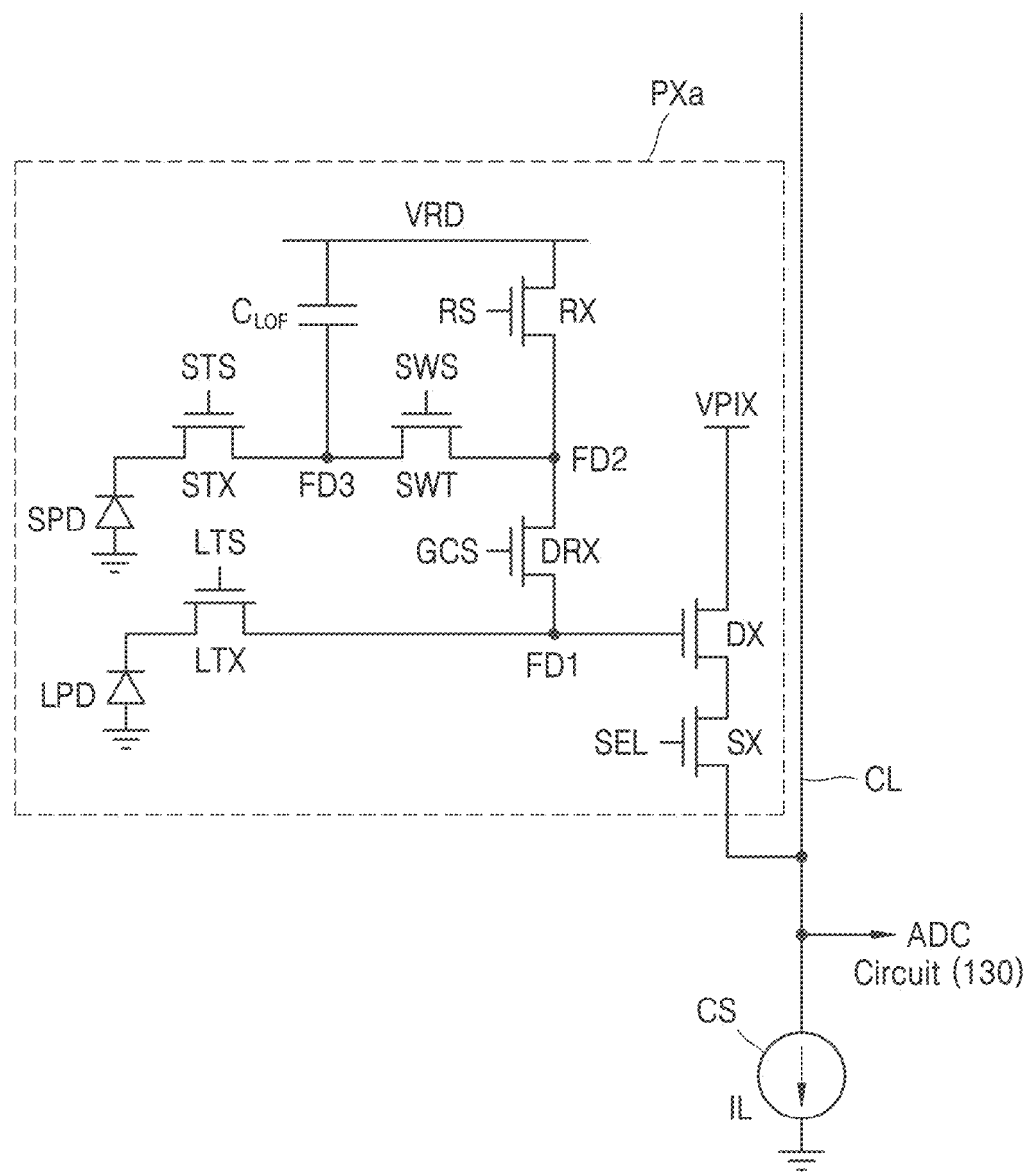
FIGS. 2A and 2B are circuit diagrams illustrating a pixel structure according to various example embodiments.

In the pixel array 110 according to various example embodiments, the pixel PX may have a pixel structure in which several photodiodes, for example, a first photodiode and a second photodiode, share some circuit elements of the pixel PX, for example, a reset transistor RX in FIG. 2A, a driving transistor DX in FIG. 2A, and a selection transistor SX in FIG. 2A. The light-receiving areas of the photodiodes may be different from each other; for example, the light-receiving area of the first photodiode may be greater than that of the second photodiode. The first photodiode may be referred to as a large photodiode LPD in FIG. 2A, and the second photodiode may be referred to as a small photodiode SPD in FIG. 2A. Alternatively or additionally, the pixel PX may include a high-capacity capacitor CLOP (see FIG. 2A) for storing charges overflowing from the second photodiode, that is, the small photodiode SPD.

Because the large photodiode LPD has a relatively large light-receiving area, the large photodiode LPD may generate more charges (e.g., more electron-hole pairs) than the small photodiode SPD under the same light-receiving conditions. For example, the large photodiode LPD may have higher sensitivity than the small photodiode SPD. Due to this characteristic, in the case of low illuminance, an image signal may be generated using a pixel signal based on charges generated by the large photodiode LPD, and in the case of high illuminance, an image signal may be generated using a pixel signal based on charges generated by the small photodiode SPD. Hereinafter, for convenience of description, it is assumed that the pixel PX includes the large photodiode LPD and the small photodiode SPD; however, example embodiments are not limited thereto. The pixel PX may include a plurality of photodiodes having the same light-receiving area or different light-receiving areas.

The pixels PX may sequentially operate according to a plurality of modes (operation modes). In various example embodiments, the pixel PX may operate in a first mode and a second mode based on the first photodiode, and may operate in a third mode and a fourth mode based on the second photodiode. The first mode and the second mode are distinguished from each other according to a conversion gain, wherein the conversion gain represents a rate at which charges generated by a photodiode, for example, the first photodiode, are converted into an electrical signal (e.g., into a pixel voltage). The conversion gain may vary according to the capacitance of a parasitic capacitor that is connected to a floating diffusion node (hereinafter, simply referred to as the capacitance of the floating diffusion node). For example, the pixel PX supports a dual conversion gain mode, the first mode may be a low conversion gain mode based on the first photodiode, and the second mode may be a high conversion gain mode based on the first photodiode. The third mode and the fourth mode may be distinguished from each other based on whether a signal according to the overflow charges of the second photodiode stored in the high-capacity capacitor provided in the pixel PX is read out (or read). The structure and mode of the pixel PX will be described in detail below with reference to FIGS. 2A to 3B and FIGS. 5A to 6.

Pixel signals of the first to fourth modes, which are read out according to the first to fourth modes, may correspond to different illuminance ranges. For example, a second mode pixel signal according to the second mode may correspond to a first illuminance section, which is the lowest illuminance section, a first mode pixel signal according to the first mode may correspond to a second illuminance section, which is higher than the first illuminance section, and a third mode pixel signal according to the third mode and a fourth mode pixel signal according to the fourth mode may respectively correspond to a third illuminance section and a fourth illuminance section, which are greater than the second illuminance section. The fourth illuminance section may be the greatest illuminance section. The first to fourth mode pixel signals may be generated within one frame period scanned after the pixel array 110 is exposed once.

At least four digital signals, such as first to fourth mode digital signals respectively generated based on the first to fourth mode pixel signals output from each of the plurality of pixels of the pixel array 110 may be combined into one image, and the combined image may have a high dynamic range.

In some example embodiments, each of the plurality of pixels PX may operate in a single exposure method in which one exposure is performed or in a multiple exposure method in which multiple exposures are performed. For example, the pixel PX may operate in a single exposure method to generate pixel signals through the first photodiode and/or the second photodiode after one exposure operation. Alternatively or additionally, the pixel PX may operate in a multiple exposure method in which a pixel signal is generated through the first photodiode and/or the second photodiode in response to a first exposure operation, and then a pixel signal is additionally generated through the first photodiode and/or the second photodiode in response to a second exposure operation.

The row driver 120 drives the pixel array 110 in units of one row or a plurality of rows. The row driver 120 may decode a row control signal (e.g., a row address) received from the timing controller 150 and may select at least one pixel row to be read out from among a plurality of pixel rows of the pixel array 110 in response to the decoded row control signal.

The row driver 120 may provide control signals, for example, one or more of a selection signal, a transfer control signal, a conversion control signal, and a switch control signal, to selected two or more pixel rows through the row lines RL. Pixels PXs included in a pixel row selected by the selection signal provided from the row driver 120 output pixel signals, for example, pixel voltages. The pixel PX may sequentially operate according to the first to fourth modes. The pixel PX may operate according to the first and second modes, and then operate according to the third and fourth modes. The pixel PX may output first to fourth mode pixel signals respectively corresponding to the first to fourth modes. The row driver 120 may generate control signals for controlling the pixel PX to operate in the first to fourth modes and provide the generated control signals to the pixel array 110.

In various example embodiments, the row driver 120 may simultaneously select one or more rows for fast readout of the pixel array 110. Two or more pixels included in two or more selected rows and arranged in the same column may be connected to different column lines CL. The readout periods of two or more pixels connected to different column lines CL may at least partially overlap each other. For example, when a pixel PX included in one row operate in the first mode and the second mode, a pixel PX included in the other row may operate in the third mode and the fourth mode. Accordingly, the plurality of rows of the pixel array 110 may be readout staggered as described below with reference to FIGS. 11C, 12B, and 13B.

The ramp signal generator 140 may generate a ramp signal RAMP that increases or decreases with a certain slope (e.g., a dynamically determined or predetermined slope), and may provide the ramp signal RAMP to each of the plurality of ADCs 135 of the ADC circuit 130. In various example embodiments, the ramp signal generator 140 may generate a first ramp signal and a second ramp signal, may provide the first ramp signal to a first correlated double sampling (CDS) circuit 131 and a second CDS circuit 132 of an ADC 135, and may provide the second ramp signal to a third CDS circuit 133 of the ADC 135. In various example embodiments, the ramp signal generator 140 may generate a first ramp signal, a second ramp signal, and a third ramp signal and provide the first to third ramp signals to the first to third CDS circuit 131 to 133.

The ADC circuit 130 may convert pixel signals (e.g., pixel voltages such as analog pixel values) output from the pixel array 110 into pixel values that are digital signals. The ADC circuit 130 may include the plurality of ADCs 135 and a switching circuit (SWC), and each of the plurality of ADCs 135 may convert a pixel signal into a pixel value by using a CDS method. A pixel signal received through each of the plurality of column lines CL may be converted into a pixel value by a corresponding ADC among the plurality of ADCs 135.

Each of the ADCs 135 may include a CDS circuit, for example, the second CDS circuit (e.g., CDS2) 132 and/or the third CDS circuit (e.g., CDS3) 133, and a counter 134. In addition, two adjacent ADCs 135 corresponding to two adjacent column lines CL, for example, the first column line CL1 and the second column line CL2, may share the first CDS circuit (i.e., CDS1) 131. In other words, two adjacent column lines CL may share the first CDS circuit 131.

In various example embodiments, two adjacent ADC 135 corresponding to two adjacent column lines CL may share the first to third CDS circuits (i.e., CDS1, CDS2, and CDS3) 131, 132, and 133.

The switching circuit SWC may include a plurality of switches, and may provide each of the outputs of the column lines CL to a corresponding ADC 135. In this case, the switching circuit SWC may provide each of the outputs of two adjacent column lines CL to the first CDS circuit 131 in a time-division manner, and/or may provide each of the outputs of two adjacent column lines CL to the first CDS circuit 131, the second CDS circuit 132, and the third CDS circuit 133 in a time-division manner. For example, the switching circuit SWC may provide the output of the first column line CL1 and the output of the second column line CL2 to the first CDS circuit 131, the second CDS circuit 132, and the third CDS circuit 133 in a time-division manner. This will be described in detail below with reference to FIGS. 5A to 6.

In this way, according to the operation of the switching circuit SWC, each of the two adjacent column lines CL may be connected, in a time-division manner, to the first CDS circuit 131 shared by two adjacent ADCs 135, and/or may be connected, in a time-division manner, to the first CDS circuit 131, the second CDS circuit 132, and the third CDS circuit 133, which are shared by two adjacent ADCs 135.

The CDS circuit (e.g., each of the first to third CDS circuits 131, 132, and 133) may compare a pixel signal received through the column line CL with the ramp signal RAMP and output a comparison result. The CDS circuit may output a comparison result signal that transitions from a first level (e.g., logic high) to a second level (e.g., logic low) when the voltage level of the ramp signal RAMP and the voltage level of the pixel signal are the same. A time point at which the level of the comparison result signal transitions may be determined according to the voltage level of the pixel signal.

The CDS circuit may sample and hold a pixel signal that is provided from the pixel PX according to a CDS method, and may double sample a certain noise level, for example, a reset level and/or a signal level. The CDS circuit may generate a comparison result signal corresponding to the reset level and a comparison result signal corresponding to the signal level. In this case, a method of reading out the signal level after reading out the reset level may be referred to as a complete CDS method, and a method of reading out the reset level after reading out the signal level may be referred to as an in-complete CDS method and/or as a delta reset sampling (DRS) method.

In order to read out the first mode pixel signal and the second mode pixel signal from one pixel PX by the complete CDS method, two CDS circuits respectively corresponding to the first mode and the second mode, for example, the low conversion gain mode and the high conversion gain mode based on the first photodiode, are required or used, and among the two CDS circuits, a CDS circuit corresponding to the second mode may correspond to the third mode and the fourth mode. Alternatively, one more CDS circuit corresponding to the third mode and the fourth mode may be required or used separately from the two CDS circuits.

As described above, when the first mode pixel signal and the second mode pixel signal are output through one of the two adjacent column lines CL according to the staggered readout, the third mode pixel signal and the fourth mode pixel signal may be output through the other column line CL. Accordingly, the first CDS circuit 131 corresponding to the first mode may be shared by two adjacent ADCs 135. Alternatively, the first CDS circuit 131 and the second CDS circuit 132 corresponding to the first mode and the second mode, respectively, and the third CDS circuit 133 corresponding to the third and fourth modes may be shared by two adjacent ADCs 135.

The counter (e.g., the counter CNT) 134 may count a time point at which the levels of comparison result signals respectively output from the first to third CDS circuits 131, 132, and 133 transition. Accordingly, a reset value and/or a signal value may be obtained for each of the first to fourth modes, and a value obtained by subtracting the reset value from the signal value may be generated as a pixel value.

Control signals provided to the ADC circuit 130, for example, switching signals provided to the switch circuit SWC and auto-zero signals provided to the first to third CDS circuits 131, 132, and 133, may be provided from the timing controller 150 or may be provided from the row driver 120 under the control of the timing controller 150.

The timing controller 150 may output a timing control signal to each of the row driver 120, the ADC circuit 130, and the ramp signal generator 150, and the row driver 120, and may control the operation and operation timing of the row driver 120, the ADC circuit 130, and the ramp signal generator 150.

The image signal processor 160 may perform various signal processing on image data output from the ADC circuit 130, for example, first to fourth image data corresponding to the first to fourth mode pixel signals, respectively. For example, the image signal processor 160 may perform signal processing, such as one or more of picture quality compensation, binning, and downsizing, on received image data. The picture quality compensation may include, for example, one or more of black level compensation, lens shading compensation, crosstalk compensation, and bad pixel correction.

Image data IDT output from the image signal processor 160 may be transmitted to an external processor. For example, the external processor may be a host processor of an electronic device on which the image sensor 100 is mounted. For example, the external processor may be or may include or be included in an application processor of a mobile terminal. The image sensor 100 may transmit image data to the external processor according to a data communication method based on a set interface, for example, mobile industry processor interface (MIPI). The external processor may generate a high dynamic range (HDR) image by merging the first to fourth images.

Figure 2B:
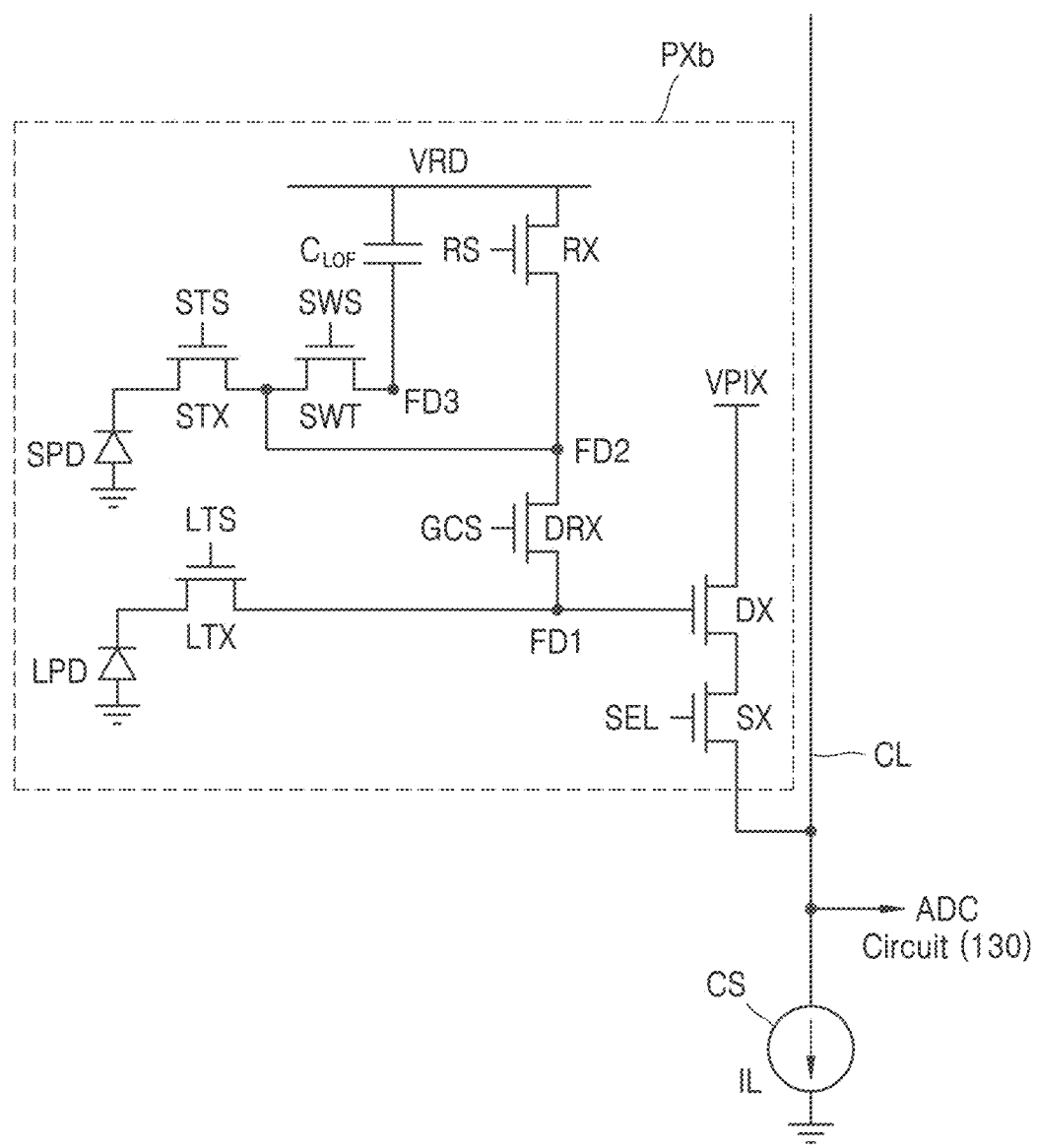

FIGS. 2A and 2B are circuit diagrams illustrating a pixel structure according to various example embodiments. Pixels PXa and PXb of FIGS. 2A and 2B may be applied as the pixel PX of the pixel array 110 of FIG. 1.

Referring to FIG. 2A, the pixel PXa may include a plurality of photodiodes, e.g., a large photodiode LPD and a small photodiode SPD. The pixel PXa may include a plurality of transistors, for example, a first transfer transistor LTX, a second transfer transistor STX, a reset transistor RX, a driving transistor DX, a selection transistor SX, a gain control transistor DRX (also referred to as a conversion gain control transistor), and a switch transistor SWT, and a capacitor $C_{LOF}$ Control signals STS, LTS, RS, SEL, GCS, and SWS may be applied to the pixel PXa, and the control signals STS, LTS, RS, SEL, GCS, and SWS may be provided from the row driver 120 in FIG. 1.

The large photodiode LPD and the small photodiode SPD may generate photocharges (e.g., electron-hole pairs) that vary according to the intensity of light. For example, the large photodiode LPD and the small photodiode SPD may generate charges, for example, negative charges or electrons and positive charges or holes in proportion to the amount of incident light. The photocharges generated by the large photodiode LPD and the small photodiode SPD may be transferred to and accumulated in at least one of first to third floating diffusion nodes FD1, FD2, and FD3. A parasitic capacitor (not shown) may be formed at each of the first to third floating diffusion nodes FD1, FD2, and FD3. Alternatively or additionally, an actual capacitor element (not shown) may be connected to each of the first to third floating diffusion nodes FD1, FD2, and FD3.

The first transfer transistor LTX may be connected between the large photodiode LPD and the first floating diffusion node FD1 and may be turned on or off in response to a first transfer control signal LTS. The first transfer transistor LTX may be turned on to transfer photocharges generated by the large photodiode LPD to the first floating diffusion node FD1.

The pixel PXa may include a conversion gain control transistor DRX. The conversion gain control transistor DRX may be connected to the first floating diffusion node FD1 and the second floating diffusion node FD2. The conversion gain control transistor DRX may be turned on or off in response to a gain control signal GCS. The conversion gain control transistor DRX may be turned on to connect the first floating diffusion node FD1 and the second floating diffusion node FD2 to each other. When the first floating diffusion node FD1 and the second floating diffusion node FD2 are connected to each other (e.g. connected in series with each other), the capacitance of the first floating diffusion node FD1 may increase and the conversion gain may decrease. When the conversion gain control transistor DRX is turned on, the pixel PXa may operate in a low conversion gain mode (hereinafter, referred to as an LCG mode). Conversely, when the conversion gain control transistor DRX is turned off, the pixel PXa may operate in a high conversion gain mode (hereinafter, referred to as an HCG mode).

The second transfer transistor STX may be connected between the small photodiode SPD and the second floating diffusion node FD2. The second transfer transistor STX may be turned on or off in response to a second transfer control signal STS, and may be turned on to transfer photocharges generated by the small photodiode SPD to the third floating diffusion node FD3.

A first terminal of the capacitor $C_{LOF}$ may be connected to the third floating diffusion node FD3, and a reset voltage VRD may be applied to a second terminal of the capacitor $C_{LOF}$. In various example embodiments, the reset voltage VRD may be equal to a pixel power supply voltage VPIX. The capacitance of the capacitor $C_{LOF}$ may be greater than the capacitance of the parasitic capacitors generated at the first floating diffusion node FD1 and the second floating diffusion node FD2, respectively. For example, the capacitor $C_{LOF}$ may be a high-capacity capacitor. Charges overflowing from the small photodiode SPD may be accumulated in the capacitor $C_{LOF}$ through the third floating diffusion node FD3.

The switch transistor SWT may be connected to the second floating diffusion node FD2 and the third floating diffusion node FD3. The switch transistor SWT may be turned on or off in response to a switch control signal SWS. When the switch transistor SWT is turned on, the second floating diffusion node FD2 and the third floating diffusion node FD3 may be connected to each other and the capacitor $C_{LOF}$ may be in parallel with the parasitic capacitor formed at the second floating diffusion node FD2. Accordingly, the capacitance of the second floating diffusion node FD2 may increase.

A first terminal of the reset transistor RX may be connected to the second floating diffusion node FD2, and the reset voltage VRD may be applied to a second terminal of the reset transistor RX. The reset transistor RX may be turned on and off in response to a reset control signal RS. When the reset transistor RX is turned on, the conversion gain control transistor DRX may be turned on. As the reset voltage VRD is applied to the first floating diffusion node FD1 and the second floating diffusion node FD2, the first floating diffusion node FD1 and the second floating diffusion node FD2 may be reset. For example, charges accumulated in the parasitic capacitors of the first floating diffusion node FD1 and the second floating diffusion node FD2 may be fully or at least partially removed. When the reset transistor RX is turned on, the conversion gain control transistor DRX and the switch transistor SWT may be turned on. As the reset voltage VRD is applied to the first to third floating diffusion nodes FD1, FD2, and FD3, the first to third floating diffusion nodes FD1, FD2, and FD3 may be reset.

A first terminal of the driving transistor DX may be connected to the selection transistor SX, and the pixel power supply voltage VPIX may be applied to a second terminal of the driving transistor DX. A first terminal of the selection transistor DX may be connected to the driving transistor DX, and a second terminal of the selection transistor DX may be connected to the column line CL. The selection transistor SX may be turned on or off in response to a selection signal SEL. When the selection transistor SX is turned on in a readout operation, the driving transistor DX may operate as a source follower that is based on a bias current IL generated by a current source CS connected to the column line CL, and the driving transistor DX may output, as a pixel signal, a voltage corresponding to the charge accumulated in the first floating diffusion node FD1.

According to various example embodiments, the conversion gain control transistor DRX may be turned on or off during a readout period of the large photodiode LPD, and thus, the pixel PX may operate in the first mode or the second mode. When the conversion gain control transistor DRX is turned on, the first floating diffusion node FD1 may be connected to the second floating diffusion node FD2 and the pixel PX may operate in the LCG mode. When the conversion gain control transistor DRX is turned off, the first floating diffusion node FD1 may be electrically disconnected from the second floating diffusion node FD2, and thus, the pixel PX may operate in the HCG mode.

During a readout period of the small photodiode SPD, the conversion gain control transistor DRX and the switch transistor SWT may be turned on. During the readout period of the small photodiode SPD, the small photodiode SPD may be read out twice.

In this case, the pixel PX may operate in the third mode or the fourth mode based on whether a signal according to the overflow charges accumulated in the capacitor $C_{LOF}$ is read out. When a reset level is read out after the first to third floating diffusion nodes FD1, FD2, and FD3 are reset after a signal level is read out, a signal according to the overflow charges accumulated in the capacitor $C_{LOF}$ may be read out. Therefore, in the readout period of the small photodiode SPD, when the signal level is read out after the reset level is read out, the pixel PX may operates in the third mode, and when the reset level is read out after the signal level is read out, the pixel PX may operates in the fourth mode. The third mode may be referred to as a CDS mode, and the fourth mode may be referred to as a lateral overflow integration capacitor (LOFIC) mode.

Referring now to FIG. 2B, the pixel PXb may include a plurality of photodiodes, e.g., a large photodiode LPD and a small photodiode SPD. The pixel PXb may include a plurality of transistors, for example, a first transfer transistor LTX, a second transfer transistor STX, a reset transistor RX, a driving transistor DX, a selection transistor SX, a gain control transistor DRX (also referred to as a conversion gain control transistor), and a switch transistor SWT, and a capacitor $C_{LOF}$. Control signals STS, LTS, RS, SEL, GCS, and SWS may be applied to the pixel PXb, and the control signals STS, LTS, RS, SEL, GCS, and SWS may be provided from the row driver 120 in FIG. 1.

The structure and/or the operation of the pixel PXb of FIG. 2B may be similar to those of the pixel PXa of FIG. 2A. However, in the pixel PXb of FIG. 2B, the second transfer transistor STX may be connected between the small photodiode SPD and the second floating diffusion node FD2. During the readout period of the small photodiode SPD, the switch transistor SWT may be turned on or off, and a signal according to the overflow charges accumulated in the capacitor $C_{LOF}$ may be read out while the switch transistor SWT is turned on. Accordingly, when the switch transistor SWT is turned on, the pixel PXb may operate in the fourth mode, and when the switch transistor SWT is turned off, the pixel PXb may operate in the third mode.

Each of the transistors illustrated in FIG. 2A, such as the first transfer transistor LTX, the second transfer transistor STX, the reset transistor RX, the driving transistor DX, the selection transistor SX, the gain control transistor DRX, and the switch transistor SWT, may have the same, or different, electrical properties and/or physical properties, as the corresponding transistors included in FIG. 2B. Furthermore, each of the photodiodes illustrated in FIG. 2A, such as the large photodiode LPD and the small photodiode SPD, may have the same, or different, electrical properties and/or physical properties, as the corresponding photodiodes included in FIG. 2B. Furthermore, the capacitor $C_{LOF}$ that is included in FIG. 2A may have the same, or different, electrical properties and/or physical properties as the capacitor $C_{LOF}$ included in FIG. 2B. Example embodiments are not limited thereto.

Figure 3A:
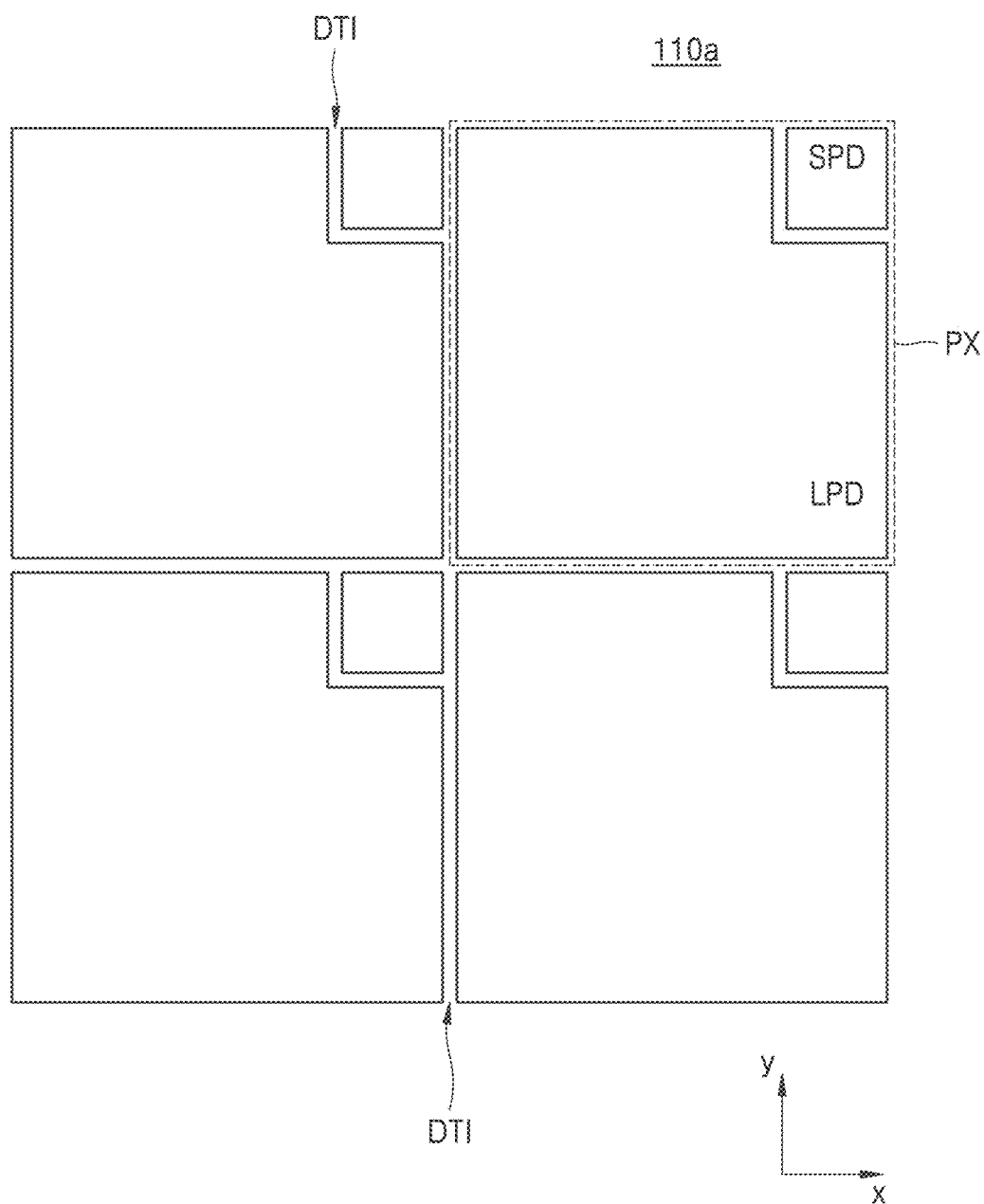
FIGS. 3A and 3B are views illustrating a split photodiode structure of a pixel according to various example embodiments.
Figure 3B:
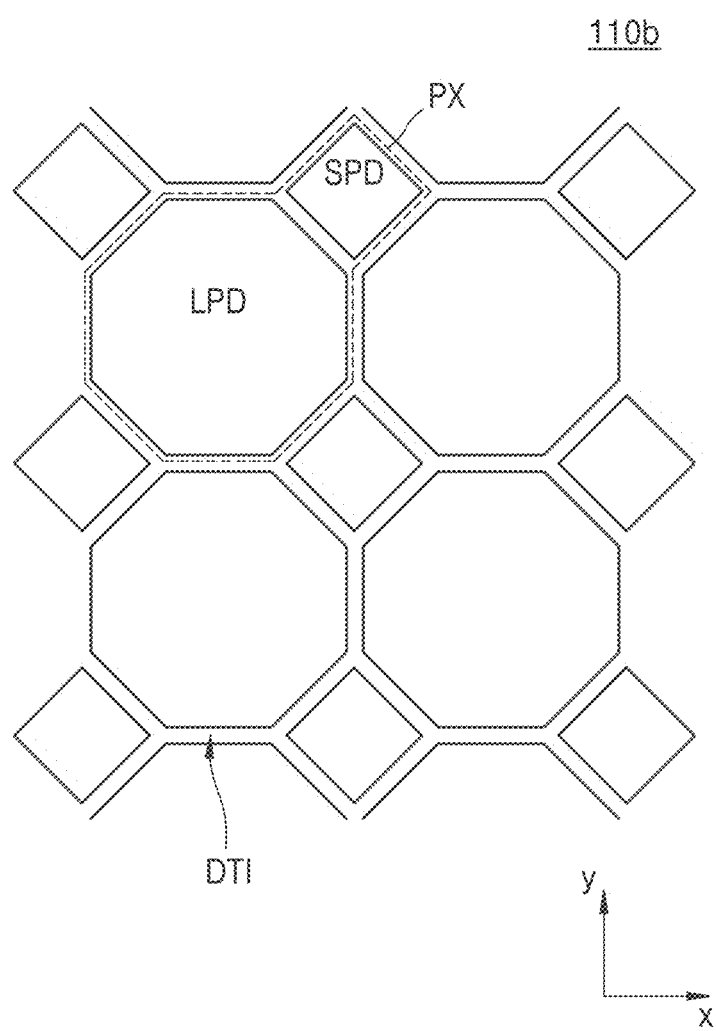

FIGS. 3A and 3B are views illustrating a split photodiode structure of a pixel according to various example embodiments.

Referring to FIG. 3A, a pixel array 110a may include a plurality of pixels PX arranged in rows and columns in an X-Y plan view. Each of the plurality of pixels PX may include a photoelectric conversion portion and a pixel circuit portion. The photoelectric conversion portion may vertically overlap the pixel circuit portion.

The photoelectric conversion portion may include a microlens, a color filter, and a photodiode. In some example embodiments, the photoelectric conversion portion may further include a color filter, a protective layer, and an insulating structure. The microlens may be disposed above the photodiode, and may be configured to condense light incident from the outside and make or focus the light incident to a photoelectric conversion element.

The pixel PX may include a large photodiode LPD and a small photodiode SPD. A region where the large photodiode LPD is formed and a region where the small photodiode SPD is formed may be separated from each other by an isolation region such as a deep trench isolation (DTI) structure. The large photodiode LPD of each pixel PX may have a relatively large light-receiving area, and the small photodiode SPD of each pixel PX may have a relatively small light-receiving area. A shape of either or both of the large photodiode LPD and the small photodiode SPD may be polygonal; however, example embodiments are not limited thereto. As shown in FIG. 3A, the large photodiode LPD and the small photodiode SPD may each have a quadrangular shape such as a square shape. As shown in FIG. 3B, the large photodiode LPD may have an octagonal shape such as a regular octagonal shape, and the small photodiode SPD may have a quadrangular shape such as a square shape. However, example embodiments are not limited thereto, and shapes of the large photodiode LPD and the small photodiode SPD may be variously modified.

A microlens condensing light incident from the outside may be disposed above each of the large photodiode LPD and the small photodiode SPD, and a color filter, a protective layer, and an insulating structure may be disposed between the microlens and the large and small photodiodes LPD and SPD.

A pixel circuit portion may be formed below the large and small photodiodes LPD and SPD, and the pixel circuit portion may include a floating diffusion node, sources/drains and gates of transistors, a load resistor, a via contact, and a wiring structure.

Figure 4A:
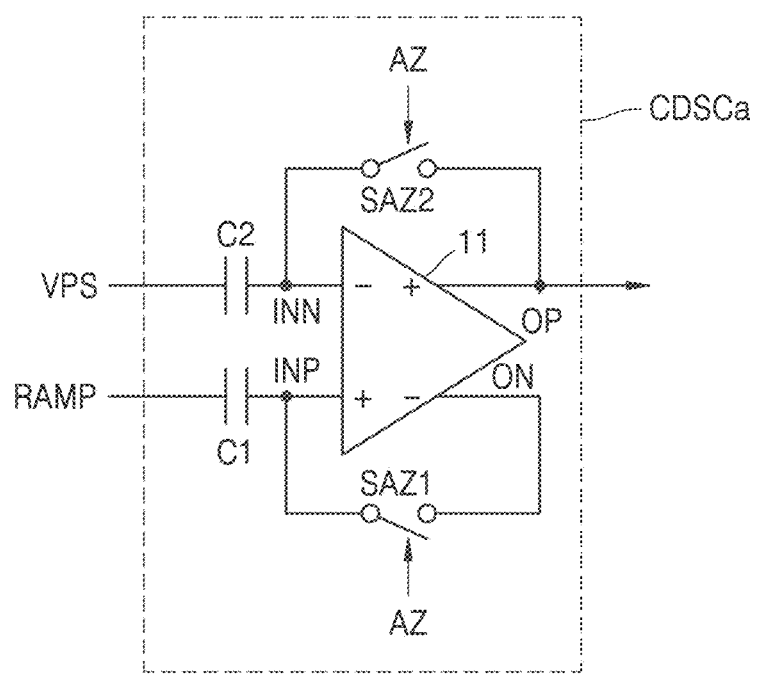
FIGS. 4A and 4B are circuit diagrams of a correlated double sampling (CDS) circuit included in an image sensor according to various example embodiments.
Figure 4B:
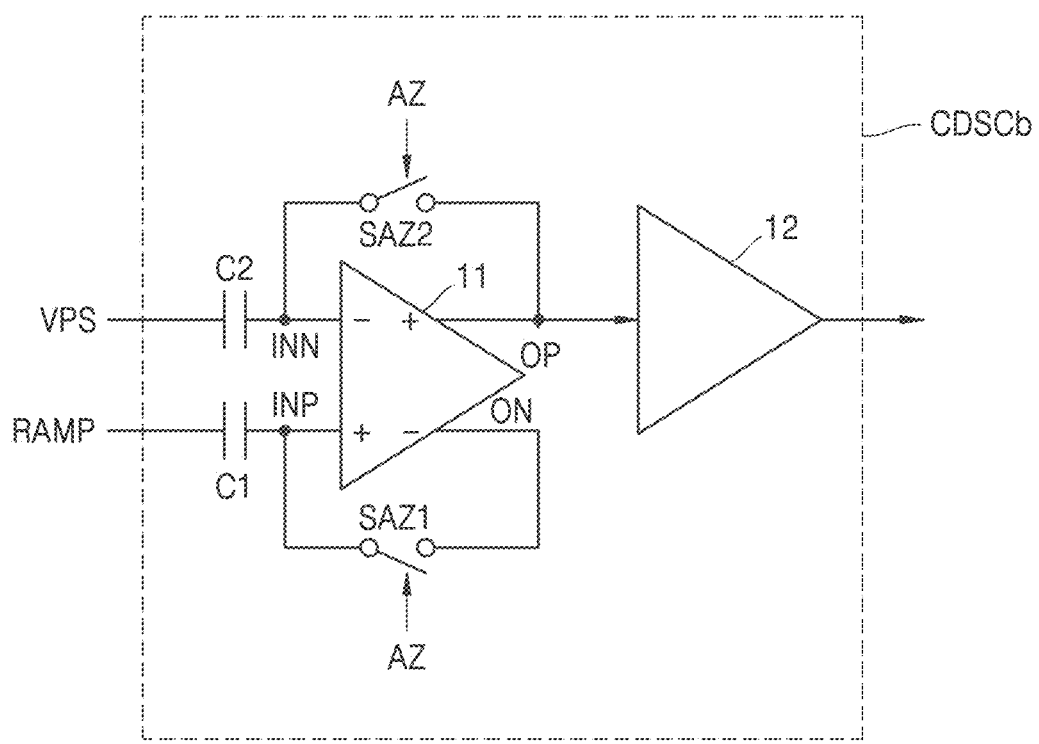

FIGS. 4A and 4B are circuit diagrams of a CDS circuit included in an image sensor according to various example embodiments.

CDS circuits CDSCa and CDSCb of FIGS. 4A and 4B may be applied to the first to third CDS circuits 131, 132, and 133 of FIG. 1.

Referring to FIG. 4A, the CDS circuit CDSCa may include a comparator 11, first and second auto-zero switches SAZ1 and SAZ2, and first and second capacitors C1 and C2.

The comparator 11 may be implemented as a differential amplifier, for example, as an operational transconductance amplifier (OTA). The first auto-zero switch SAZ1 may be connected to a first input terminal INP and a second output terminal ON of the comparator 11, and the second auto-zero switch SAZ2 may be connected to a second input terminal INN and a first output terminal OP of the comparator 11. The first and second auto-zero switches SAZ1 and SAZ2 may be turned on and off in response to an auto-zero signal AZ. In various example embodiments, the first and second auto-zero switches SAZ1 and SAZ2 may be implemented as transistors.

A ramp signal RAMP may be applied to one end of the first capacitor C1 and the other end of the first capacitor C1 may be connected to the first input terminal INP of the comparator 11. A pixel signal VPS may be applied to one end of the second capacitor C2 and the other end of the second capacitor C2 may be connected to the second input terminal INN of the comparator 11. For example, the ramp signal RAMP and the pixel signal VPS may be provided to the first input terminal INP and the second input terminal INN of the comparator 11 through the first capacitor C1 and the second capacitor C2, respectively. In this case, the first capacitor C1 and the second capacitor C2 are coupling capacitors and may respectively fully or at least partially block DC components of the ramp signal RAMP and the pixel signal VPS and provide AC components of the ramp signal RAMP and the pixel signal VPS to the first input terminal INP of the comparator 11 and the second input terminal INN of the comparator 11.

The CDS circuit CDSCa may perform an auto-zero operation based on a reset level (i.e., a reset level in the LCG mode or a reset level in the HCG mode) provided as the pixel signal VPS before a comparison operation. The first and second auto-zero switches SAZ1 and SAZ2 may be turned on in response to an auto-zero signal AZ, and thus, the first input terminal INP and the second output terminal ON of the comparator 11 may be connected to each other, and the second input terminal INN and the first output terminal OP may be connected to each other. Accordingly, the offset of the comparator 11 may be canceled or reduced, and the DC operating level of the comparator 11 may be determined.

When the first and second auto-zero switches SAZ1 and SAZ2 are turned on, the first input terminal INP, voltage levels of the second input terminal INN, the first output terminal OP, and the second output terminal ON of the comparator 11 may be the same. The voltage levels of the first input terminal INP, the second input terminal INN, the first output terminal OP, and the second output terminal ON may be referred to as an auto-zero voltage. The auto-zero voltage may be determined according to the pixel signal VPS, the ramp signal RAMP, and the offset of the comparator 11. The auto-zero voltage may be at the DC operating level of the comparator 11.

During the comparison operation after the auto-zero operation, the first and second auto-zero switches SAZ1 and SAZ2 may be turned on, and the AC components of the ramp signal RAMP and the pixel signal VPS may be added to the auto-zero voltage and applied to the first input terminal INP and the second input terminal INN of the comparator 11. During the comparison operation, as the ramp signal RAMP having a voltage level obtained by adding an offset to the voltage level during the auto-zero operation is applied to the first input terminal INP through the first capacitor C1, the voltage level of the first input terminal INP is higher than the voltage level of the second input terminal INN, and thus, the comparator 11 may output a logic high signal. Thereafter, as the ramp signal RAMP decreases at a certain slope, the voltage level of the first input terminal INN may decrease. When the voltage level of the first input terminal INP is lowered to or less than the voltage level of the second input terminal INP, the comparator 11 may output a logic low signal. A period from the time the ramp signal RAMP starts to decrease to the time the comparator 11 outputs the logic low signal may be generated as a digital value corresponding to the pixel signal (e.g., a reset level or a signal level) by the counter 134 in FIG. 1.

Referring to FIG. 4B, the CDS circuit CDSCb may include a comparator 11, first and second auto-zero switches SAZ1 and SAZ2, first and second capacitors C1 and C2, and an amplifier 12.

Compared to the CDS circuit CDSCa of FIG. 4A, the CDS circuit CDSCb may further include the amplifier 12. The amplifier 12 may be implemented, for example, as an OTA. The amplifier 12 may operate as an inverter or buffer. The amplifier 12 may amplify or invert and amplify a comparison result signal output from the comparator 11 and output an amplified signal.

Figure 5A:
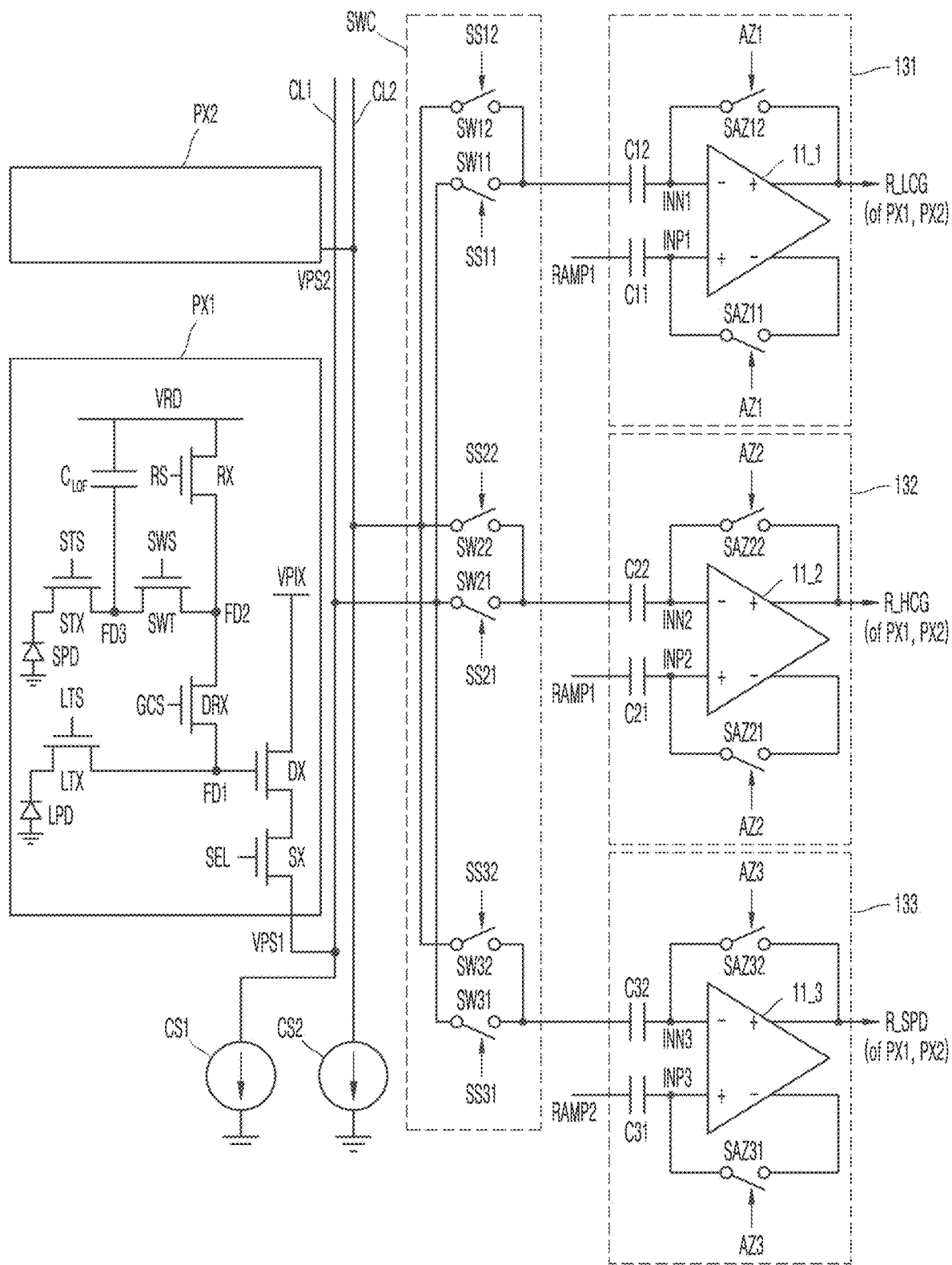
FIGS. 5A and 5B schematically illustrate connections between pixels and CDS circuits in an image sensor according to various example embodiments.
Figure 5B:
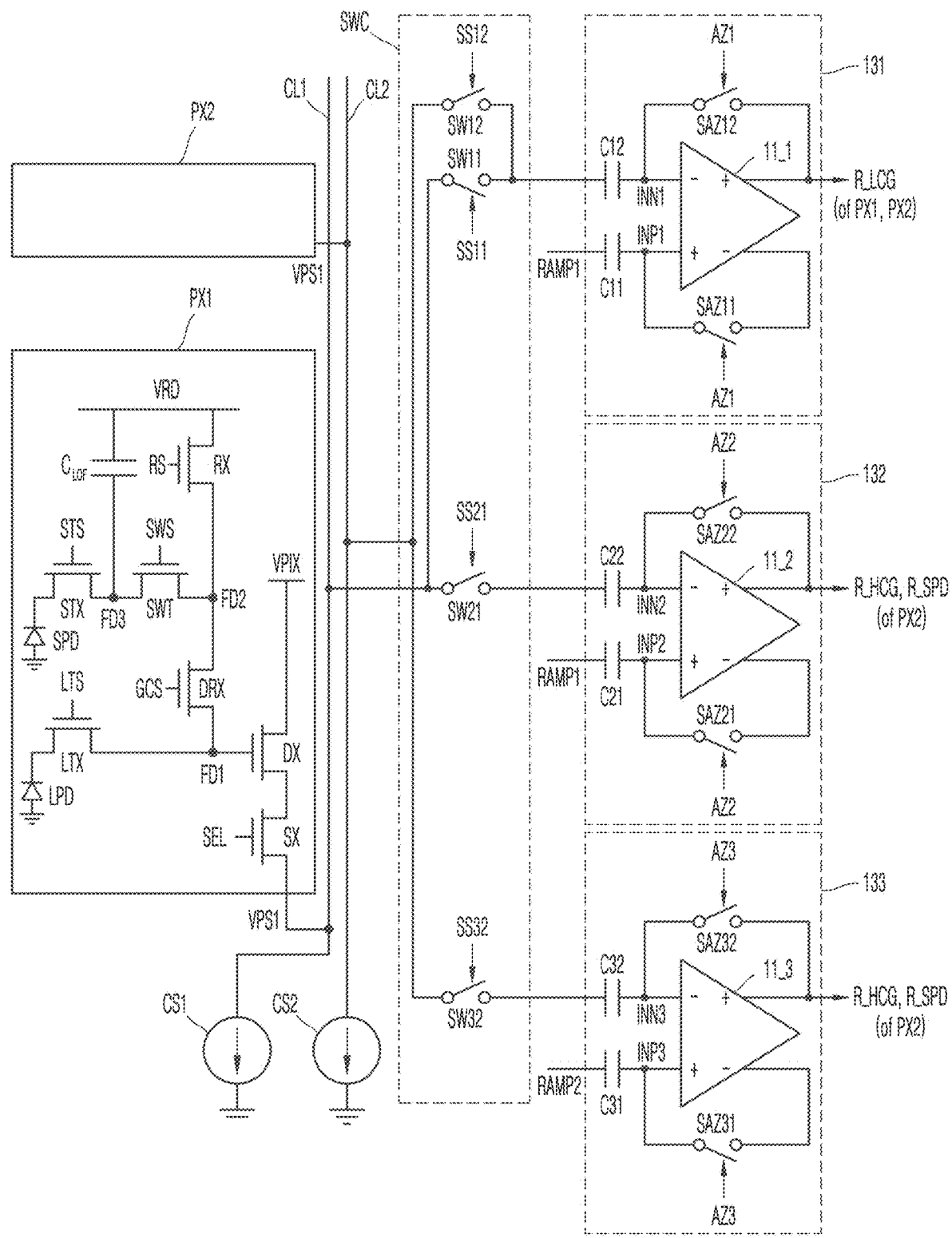

FIGS. 5A and 5B schematically illustrate connections between pixels and CDS circuits in an image sensor according to various example embodiments.

Referring to FIG. 5A, a switching circuit SWC may be disposed between first to third CDS circuits 131 to 133 and first and second column lines CL1 and CL2, and a plurality of switches SW11, SW12, SW21, SW22, SW31, and SW32 provided in the switching circuit SWC may time-divisionally connect the first to third CDS circuits 131 to 133 to the first and second column lines CL1 and CL2.

The switches SW11, SW21, and SW31 may be turned on or turned off in response to switching signals SS11, SS21, and SS31, respectively, and the switches SW12, SW22, and SW32 may be turned on or turned off in response to switching signals SS12, SS22, and SS32, respectively.

The switch SW11 may be turned on to connect the first column line CL1 to the first CDS circuit 131, the switch SW21 may be turned on to connect the first column line CL1 to the second CDS circuit 132, and the switch SW31 may be turned on to connect the first column line CL1 to the third CDS circuit 133. The switches SW11, SW21, and SW31 may not be simultaneously turned on, but may be time-divisionally turned on at different periods. Accordingly, a first pixel signal VPS1 output from a first pixel PX1 through the first column line CL1 may be time-divisionally provided to the first CDS circuit 131, the second CDS circuit 132, and the third CDS circuit 133.

The switches SW12, SW22, and SW32 may be turned on or turned off in response to the switching signals SS12, SS22, and SS32, respectively. The switch SW12 may be turned on to connect the second column line CL2 to the first CDS circuit 131, the switch SW22 may be turned on to connect the second column line CL2 to the second CDS circuit 132, and the switch SW32 may be turned on to connect the second column line CL2 to the third CDS circuit 133. The switches SW12, SW22 and SW32 may not be simultaneously turned on, but may be time-divisionally turned on. Accordingly, a second pixel signal VPS2 output from a second pixel PX2 through the second column line CL2 may be time-divisionally provided to the first CDS circuit 131, the second CDS circuit 132, and the third CDS circuit 133.

Here, the switches SW11 and SW12 may not be simultaneously turned on, but may be turned on at different periods to selectively connect the first CDS circuit 131 to the first column line CL1 or the second column line CL2. The switches SW21 and SW22 may not be simultaneously turned on, but may be turned on at different periods to selectively connect the second CDS circuit 132 to the first column line CL1 or the second column line CL2. The switches SW31 and SW32 may not be simultaneously turned on, but may be turned on at different periods to selectively connect the third CDS circuit 133 to the first column line CL1 or the second column line CL2.

According to the switching operations of the plurality of switches SW11, SW12, SW21, SW22, SW31, and SW32, the first CDS circuit 131, the second CDS circuit 132, and the third CDS circuit 133 may be time-divisionally connected to the first column line CL1 and the second column line CL2, and may read out pixels connected to the first column line CL1 and the second column line CL2, for example, a first pixel PX1 and a second pixel PX2. The first CDS circuit 131 may generate a comparison result signal R_LCG in the LCG mode based on a pixel signal indicating a reset level of the LCG mode from the first pixel PX1 and the second pixel PX2, and the second CDS circuit 132 may generate a comparison result signal R_LCG in the HCG mode based on a pixel signal indicating a reset level of the HCG mode from the first pixel PX1 and the second pixel PX2. The third CDS circuit 133 may generate a comparison result signal R_SPD in a read mode (e.g., an SC mode or SLOF mode to be described below) of a small photodiode SPD based on a pixel signal indicating a level according to the small photodiode SPD from the first pixel PX1 and the second pixel PX2.

Because the first column line CL1 and the second column line CL2 share the first CDS circuit 131, the second CDS circuit 132, and the third CDS circuit 133, readout periods of pixels connected to the first column line CL1 and the second column line CL2, for example, the first pixel PX1 and the second pixel PX2, may partially overlap each other, as described below with reference to FIG. 9B. Pixel signals output through the first column line CL1 and the second column line CL2, for example, the first pixel signal VPS1 and the second pixel signal VPS2, may be time-divisionally applied to a second input terminal INN1 of a first comparator 11_1, a second input terminal INN2 of a second comparator 11_2, and a third input terminal INN3 of a third comparator 11_3 through capacitors C12, C22, and C32, respectively. In this case, a first ramp signal RAMP1 may be applied to a first input terminal INP1 of the first comparator 11_1 and a first input terminal INP2 of the second comparator 11_2 through capacitors C11 and C21, and a second ramp signal RAMP2 may be applied to a first input terminal INP3 of the third comparator 11_3 through a capacitor C31.

Referring to FIG. 5B, a plurality of switches SW11, SW12, SW21, and SW32 may time-divisionally connect a first CDS circuit 131 and a second CDS circuit 132 to a first column line CL1 and connect the first CDS circuit 131 and a third CDS circuit 133 to a second column line CL2.

The switches SW11 and SW12 may connect the first CDS circuit 131 to the first column line CL1 or the second column line CL2 in response to switch signals SS11 and SS12. Here, the switches SW11 and SW12 may not be simultaneously turned on, and may selectively connect the first CDS circuit 131 to the first column line CL1 or the second column line CL2.

The switch SW21 may be turned on to connect the first column line CL1 to the second CDS circuit 132. The switches SW11 and SW21 may not be simultaneously turned on, but may be time-divisionally turned on at different periods. Accordingly, a first pixel signal VPS1 output from a first pixel PX1 through the first column line CL1 may be time-divisionally provided to the first CDS circuit 131 and the second CDS circuit 132.

The switch SW32 may be turned on to connect the first column line CL1 to the second CDS circuit 132. The switches SW12 and SW32 may not be simultaneously turned on, but may be time-divisionally turned on at different periods. Accordingly, a second pixel signal VPS2 output from a second pixel PX2 through the second column line CL2 may be time-divisionally provided to the first CDS circuit 131 and the third CDS circuit 133.

Figure 6:
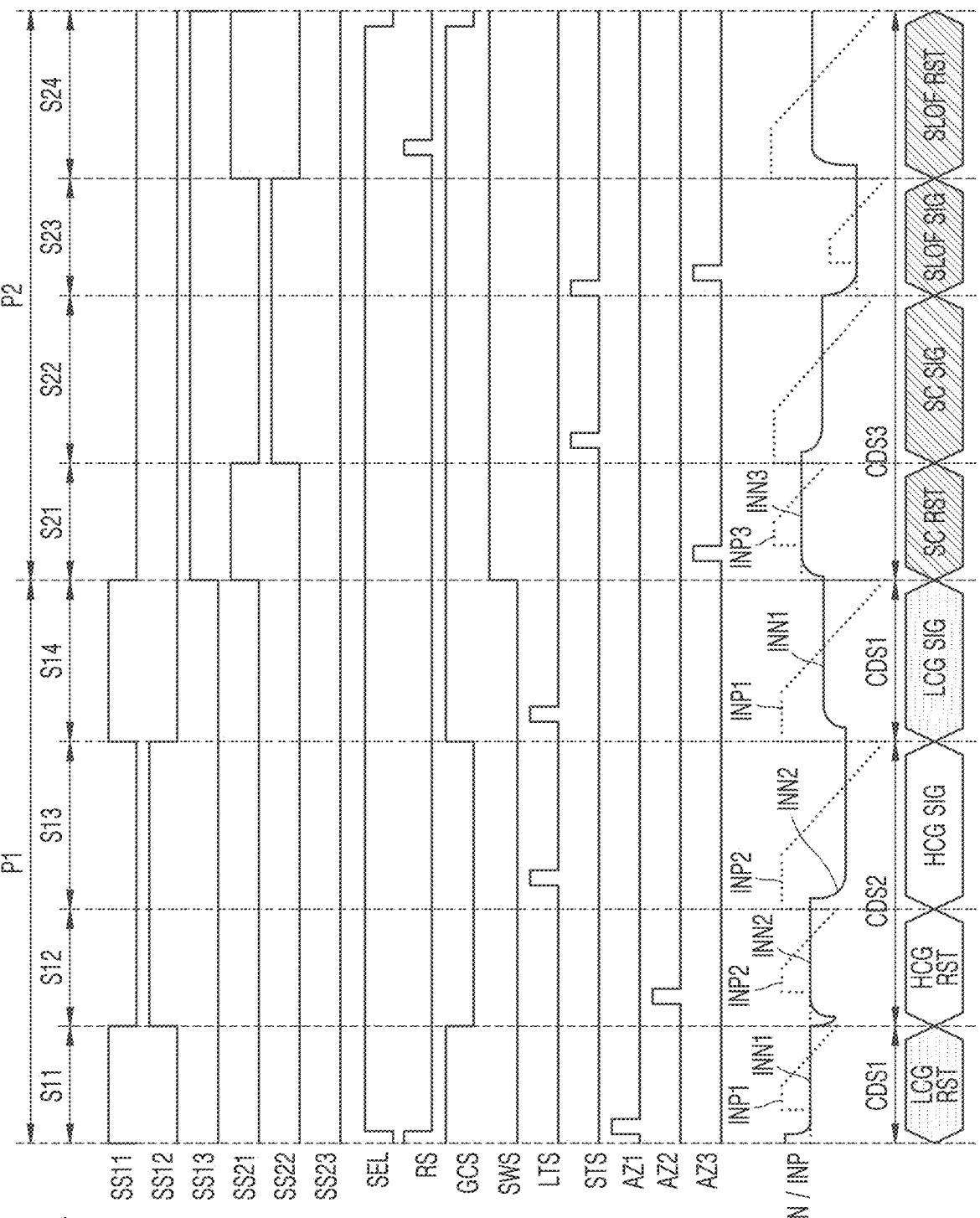
FIG. 6 is a timing diagram illustrating operations of pixels and CDS circuits in FIGS. 5A and 5B.

FIG. 6 is a timing diagram illustrating operations of pixels and CDS circuits in an image sensor according to various example embodiments.

A readout operation of the pixel PX of FIG. 1, for example, the first pixel PX1, will be described with reference to FIGS. 5A and 6. The readout operation of the first pixel PX1 may be similarly applied to other pixels PX.

In FIG. 6, it is assumed that the active levels of control signals, for example, switching signals SS11 to SS23, a selection signal SEL, a reset signal RS, a gain control signal GCS, a switch control signal SWS, a first transfer control signal LTS, a second transfer control signal STS, a first auto-zero signal AZ1, a second auto-zero signal AZ2, and a third auto-zero signal AZ3, are logic high (a first level), and the inactive levels of the control signals are logic low (a second level).

The readout period of the first pixel PX1 may be referred to as one horizontal period, and one horizontal period may be identified by a vertical synchronization signal. During the readout period of the first pixel PX1, the selection transistor SX may be turned on in response to the selection signal SEL having a logic high level. Accordingly, the first pixel PX1 may be connected to the first column line CL1, and thus, the first pixel PX1 may be read out. The readout period of the first pixel PX1 may include a first period P1 and a second period P2. During the first period P1, the large photodiode LPD may be read out, and during the second period P2, the small photodiode SPD may be read out.

The first period P1 may include first to fourth sub-periods S11, S12, S13 and S14. In the first sub-period S11 and the fourth sub-period S14, the first pixel PX1 may operate in the LCG mode based on the large photodiode LPD. In response to the active level of the switching signal SS11, the switch SW11 may be turned on to provide the first pixel signal VPS1 to the first CDS circuit 131 through the first column line CL1. In the first sub-period S11, the first CDS circuit 131 may read out a reset level LCG RST (hereinafter, referred to as an LCG reset level) in the LCG mode, and in the fourth sub-period S14, the first CDS circuit 131 may read out a signal level LCG SIG (hereinafter, referred to as an LCG signal level) in the LCG mode.

In the second sub-period S12 and the third sub-period S13, the first pixel PX1 may operate in the HCG mode based on the large photodiode LPD. In response to the active level of the switching signal SS12, the switch SW12 may be turned on to provide the first pixel signal VPS1 to the second CDS circuit 132 through the first column line CL1. In the second sub-period S12, the second CDS circuit 132 may read out a reset level HCG RST (hereinafter, referred to as an HCG reset signal) in the HCG mode, and in the third sub-period S13, the second CDS circuit 132 may read out a signal level HCG SIG (hereinafter, referred to as an HCG image signal) in the HCG mode.

In response to the reset signal RS transitioning from logic high to logic low in the first sub-period S11, the reset transistor RX may change from a turn-on state to a turn-off state. The conversion gain control transistor DRX may be turned on in response to the gain control signal GCS having a logic high level. The pixel PX may operate in the LCG mode, and the LCG reset level may be output as the first pixel signal VPS1.

In the first sub-period S11, the switch SW11 may be turned on in response to the active level of the switching signal SS11, and thus, the first column line CL1 may be connected to the second input terminal INN1 of the first CDS circuit 131. The first auto-zero signal AZ1 may be toggled to an active level, and in response to the first auto-zero signal AZ1, the first and second auto-zero switches SAZ11 and SAZ12 of the first CDS circuit 131 may be turned on, and thus, the first CDS circuit 131 may perform an auto-zero operation. As the auto-zero operation is performed, the voltage levels of the first input terminal INP1 and the second input terminal INN1 of the comparator 11_1 of the first CDS circuit 131 may be equal to a first auto-zero level.

Thereafter, the voltage level of the first input terminal INP1 may increase according to the change of the first ramp signal RAMP1 and then decrease with a certain slope. The output of the first CDS circuit 131, that is, the first comparison result signal, may transition from logic high to logic low when the voltage level of the first input terminal INP1 is less than or equal to the voltage level of the second input terminal INN1. As such, according to the comparison operation of the comparator 11_1, the LCG reset level of the first pixel PX1 may be read out.

In the second sub-period S12, the switch SW11 may be turned off in response to the inactive level of the switching signal SS11 and the switch SW12 may be turned on in response to the active level of the switching signal SS12. The first column line CL1 may be connected to the second input terminal INN2 of the second CDS circuit 132. The gain control signal GCS may transition from logic high to logic low, and the conversion gain control transistor DRX may be turned off in response to the gain control signal GCS. The pixel PX may operates in the HCG mode, and the HCG reset level may be output as the first pixel signal VPS1.

The second auto-zero signal AZ2 may be toggled to an active level, and in response to the second auto-zero signal AZ2, the first and second auto-zero switches SAZ21 and SAZ22 of the second CDS circuit 132 may be turned on, and thus, the second CDS circuit 132 may perform an auto-zero operation. As the auto-zero is performed, the voltage levels of the first input terminal INP2 and the second input terminal INN2 of the comparator 11_2 of the second CDS circuit 132 may be equal to a second auto-zero level. Thereafter, the HCG reset level of the first pixel PX may be read out according to the comparison operation of the comparator 11_2.

In the third sub-period S13, the first column line CL1 may be connected to the second input terminal INN2 of the second CDS circuit 132. In the third sub-period S13, the first pixel PX1 may operate in the HCG mode, and the HCG image signal may be output as a pixel signal VPS. In the third sub-period S13, the first transfer control signal LTS may be toggled to an active level, and the first transfer control transistor LTX may be turned on in response to the first transfer control signal LTS. Charges (electrons and/or holes) generated by the large photodiode LPD may be transferred to the first floating diffusion node FD1 and accumulated in the first floating diffusion node FD1, specifically, a parasitic capacitor connected to the first floating diffusion node FD1. The first pixel signal VPS1 corresponding to the potential of the first floating diffusion node FD1, that is, the HCG signal level of the first pixel PX1, may be applied to the second input terminal INN2 of the second CDS circuit 132 through the first column line CL1. Accordingly, the voltage level of the second input terminal INN2 may be lower than the second auto-zero level. Thereafter, the HCG signal level of the first pixel PX1 may be read out according to the comparison operation of the comparator 11_2. The counter 134 in FIG. 1 may calculate a difference between a value corresponding to the HCG signal level and a value corresponding to the HCG reset level as a pixel value of the HCG mode.

In the fourth sub-period S14, the switch SW12 may be turned off in response to the inactive level of the switching signal SS12 and the switch SW11 may be turned on in response to the active level of the switching signal SS11. The first column line CL1 may be connected to the second input terminal INN1 of the first CDS circuit 131 again. The gain control signal GCS may transition from logic low to logic high, and the conversion gain control transistor DRX may be turned on in response to the gain control signal GCS. The first floating diffusion node FD1 and the second floating diffusion node FD2 may be connected to each other, and thus, the first pixel PX1 may operate in the LCG mode and the LCG signal level may be output as the first pixel signal VPS1.

The first transfer control signal LTS may be toggled to an active level, and the first transfer control transistor LTX may be turned on in response to the first transfer control signal LTS. Charges remaining in the large photodiode LPD may be transferred to the first floating diffusion node FD1 and may be accumulated in the first floating diffusion node FD1.

The first pixel signal VPS1 corresponding to the potential of the first floating diffusion node FD1, that is, the LCG signal level of the first pixel PX1, may be applied to the second input terminal INN1 of the second CDS circuit 132 through the first column line CL1. The voltage level of the second input terminal INN1 of the first CDS circuit 131 may be lower than the first auto-zero level determined in the first sub-period S11. Thereafter, the LCG signal level of the first pixel PX1 may be read out according to the comparison operation of the comparator 11_1. The counter 134 in FIG. 1 may calculate a difference between a value corresponding to the LCG signal level and a value corresponding to the LCG reset level as a pixel value of the LCG mode.

During the second period P2, the small photodiode SPD may be read out. The second period P2 may include fifth to eighth sub-periods S21, S22, S23, and S24. In the fifth sub-period S21 and the sixth sub-period S22, the pixel PX may operate in the CDS mode (hereinafter, referred to as an SC mode) based on the small photodiode SPD, and in the seventh sub-period S23 and the eighth sub-period S24, the pixel PX may operate in the LOFIC mode (hereinafter, referred to as an SLOF mode) based on the small photodiode SPD.

During the second period P2, the switch SW11 may be turned off in response to the inactive level of the switching signal S S11, and the switch SW13 may be turned on in response to the active level of the switching signal SS13. The third CDS circuit 133 may be connected to the first column line CL1, and thus, the third CDS circuit 133 may read out a reset level SC RST and a signal level SC SIG (hereinafter, referred to as an SC reset signal and an SC image signal) in the SC mode and may read out a reset level SLOF RST and a signal level SLOF SIG (hereinafter, referred to as an SLOF reset signal and an SLOF image signal) in the SLOF mode.

The first pixel signal VPS1 output through the first column line CL1 may be provided to the second input terminal INNS of the third comparison circuit 11_3 through the capacitor C32, and the second ramp signal RAMP2 may be provided to the first input terminal INP3 of the third comparison circuit 11_3 through to the capacitor C31.

In the fifth sub-period S21, the reset transistor RX may be turned off in response to a logic low level of the reset signal RS, and the switch transistor SW may be turned on in response to a logic high level of the switch control signal SWS. Accordingly, the first floating diffusion node FD1, the second floating diffusion node FD2, and the third floating diffusion node FD3 may be electrically connected to each another to form one floating diffusion node. As such, the first pixel PX1 may operate in the SC mode, and the SC reset level may be output as the first pixel signal VPS1.

The third auto-zero signal AZ3 may be toggled to an active level, and in response to the third auto-zero signal AZ3, the first and second auto-zero switches SAZ31 and SAZ32 of the third CDS circuit 133 may be turned on, and thus, the third CDS circuit 133 may perform an auto-zero operation. As the auto-zero is performed, the voltage levels of the first input terminal INP3 and the second input terminal INN3 of the comparator 11_3 of the third CDS circuit 133 may be equal to a third auto-zero level. Thereafter, the SC reset level may be read out according to the comparison operation of the comparator 11_3.

In the sixth sub-period S22, the first pixel PX1 may operate in the SC mode, and the SC signal level may be output as the first pixel signal VPS1. The second transfer control signal STS may be toggled to an active level, and the second transfer control transistor STX may be turned on in response to the second transfer control signal STS. Charges generated by the small photodiode SPD may be transferred to a floating diffusion node, that is, the first to third floating diffusion nodes FD1, FD2, and FD3 electrically connected to each other. The first pixel signal VPS1 corresponding to the potential of the floating diffusion node, that is, the SC signal level of the first pixel PX1, may be applied to the second input terminal INN3 of the third CDS circuit 133 through the first column line CL1. Accordingly, the voltage level of the second input terminal INN3 may be lower than the third auto-zero level. Thereafter, the SC signal level of the first pixel PX1 may be read out according to the comparison operation of the comparator 11_3.

In the seventh sub-period S23, the first pixel PX1 may operate in the SLOF mode, and the SLOF signal level may be output as the first pixel signal VPS1. The second transfer control signal STS may be toggled to an active level, and the second transfer control transistor STX may be turned on in response to the second transfer control signal STS. Charges remaining in the small photodiode SPD may be transferred to a floating diffusion node. The first pixel signal VPS1 corresponding to the potential of the first floating diffusion node FD1, that is, the SLOF signal level of the first pixel PX1, may be applied to the second input terminal INN3 of the third CDS circuit 133 through the first column line CL1.

The third auto-zero signal AZ3 may be toggled to an active level, and in response to the third auto-zero signal AZ3, the first and second auto-zero switches SAZ31 and SAZ32 of the third CDS circuit 133 may be turned on, and thus, the third CDS circuit 133 may perform an auto-zero operation. As the auto-zero is performed, the voltage levels of the first input terminal INP3 and the second input terminal INN3 of the comparator 11_3 of the third CDS circuit 133 may be equal to a fourth auto-zero level. Thereafter, the SLOF signal level may be read out according to the comparison operation of the comparator 11_3.

In the eighth sub-period S24, the first pixel PX1 may operate in the SLOF mode, and the SLOF reset level may be output as the first pixel signal VPS1.

The reset signal RS may be toggled to an active level, and the reset transistor RX may be turned on in response to the reset signal RS and apply the reset voltage VRD to a floating diffusion node, that is, to the first to third floating diffusion nodes FD1, FD2, and FD3 electrically connected to each other. Accordingly, the potential of the floating diffusion node increases. The SLOF reset level is output as the first pixel signal VPS1, and the voltage level of the second input terminal INN3 increases according to a change in the first pixel signal VPS1. Thereafter, the SLOF signal level of the first pixel PX1 may be read out according to a comparison operation between the voltage level of the first input terminal INP3 of the comparator 11_3 and the voltage level of the second input terminal INN3 of the comparator 11_3.

In addition, in the second period P2, when the third CDS circuit 133 is connected to the first pixel PX1 through the first column line CL1 and reads out the pixel signal VPS of the first pixel PX1 operating in the SC mode and the SLOF mode, the first CDS circuit 131 and the second CDS circuit 132 may be connected to another pixel, for example, the second pixel PX2, through the second column line CL2, and read out the second pixel PX2 operating in the LCG mode and the HCG mode.

In response to the switching signal SS21 having an active level in the fifth sub-period S21 and the eighth sub-period S24, the switch SW12 may be turned on and connect the second column line CL2 to the second input terminal INN1 of the first CDS circuit 131. The second pixel signal VPS2 from the second pixel PX2 according to the LCG mode may be provided to the first CDS circuit 131 through the second column line CL2. In response to the switching signal SS22 having an active level in the sixth sub-period S22 and the seventh sub-period S23, the switch SW22 may be turned on and connect the second column line CL2 to the second input terminal INN1 of the second CDS circuit 132. The second pixel signal VPS2 from the second pixel PX2 according to the HCG mode may be provided to the second CDS circuit 132 through the second column line CL2. The operation of the second pixel PX2 in the second period P2 is the same as that of the first pixel PX1 in the first period P1, and thus, repeated descriptions thereof are omitted.

In this way, the first to third CDS circuits 131, 132, and 133 are shared by two column lines, and thus, the first pixel PX1 and the second pixel PX2 may be read out staggered in time.

As described above, in the image sensor according to the embodiment, the first CDS circuit 131 may be used in the LCG mode, the second CDS circuit 132 may be used in the HCG mode, and the third CDS circuit 133 may be used in the SC mode and the SLOF mode. Because each of the first to third CDS circuits 131, 132, and 133 operates in response to a certain mode, each of the first to third CDS circuits 131, 132, and 133 may be customized according to a corresponding mode. For example, the first to third CDS circuits 131, 132, and 133 may be designed to cover input signals according to corresponding modes and may have different operating ranges. Accordingly, the sizes of transistors provided in each of the first to third CDS circuits 131, 132, and 133 may be different from each other, and thus, the layout areas of the first to third CDS circuits 131, 132, and 133 may be different from each other. In this way, because each of the first to third CDS circuits 131, 132, and 133 operates in response to a certain mode, the performance of the first to third CDS circuits 131, 132, and 133 may be improved and the circuit size (i.e., the layout area) of the ADC circuit 130 in FIG. 1, which includes the first to third CDS circuits 131, 132, and 133, may be reduced.

In addition, because the first to third CDS circuits 131, 132, and 133 are shared by two adjacent column lines according to the staggered readout, the circuit size of the ADC circuit 130 may be reduced compared to the case where the first to third CDS circuits 131, 132, and 133 are provided in each column line.

As shown in FIG. 5B, when the first and second CDS circuits 131 and 132 are connected to the first column line CL1 and the first and third CDS circuits 131 and 133 are connected to the second column line CL2, the first CDS circuit 131 may perform readout of an LCG pixel signal of a pixel connected to the first column line CL1, for example, the first pixel PX1, and the second CDS circuit 132 may perform readout of an HCG pixel signal and the small photodiode SPD. In other words, in the first period P1, as shown in FIG. 6, the first CDS circuit CDS1 and the second CDS circuit CDS2 may read out an LCG pixel signal and an HCG pixel signal of the first pixel PX1, and in the second period P2, the second CDS circuit CDS2 may read out an SC pixel signal and an SLOF pixel signal of the first pixel PX1. In the second period P2, the first CDS circuit 131 may perform readout of an LCG pixel signal of the second pixel PX2, and the third CDS circuit 133 may perform readout of an HCG pixel signal and the small photodiode SPD.

In this way, corresponding CDS circuits, for example, the second CDS circuit 132 and the third CDS circuit 133, may perform readout operations on two column lines, and the first CDS circuit 131 may be shared by two column lines and read out LCG pixel signals of pixels PX connected to the two column lines. Accordingly, the pixels PXs connected to the two column lines may be read out staggered.

An embodiment in which two column lines share the first to third CDS circuits 131, 132, and 133, as shown in FIG. 5A, and various example embodiments in which two column lines share the first CDS circuit 131, as shown in FIG. 5B, will be described below with reference to FIGS. 9A and 9B.

Figure 7:
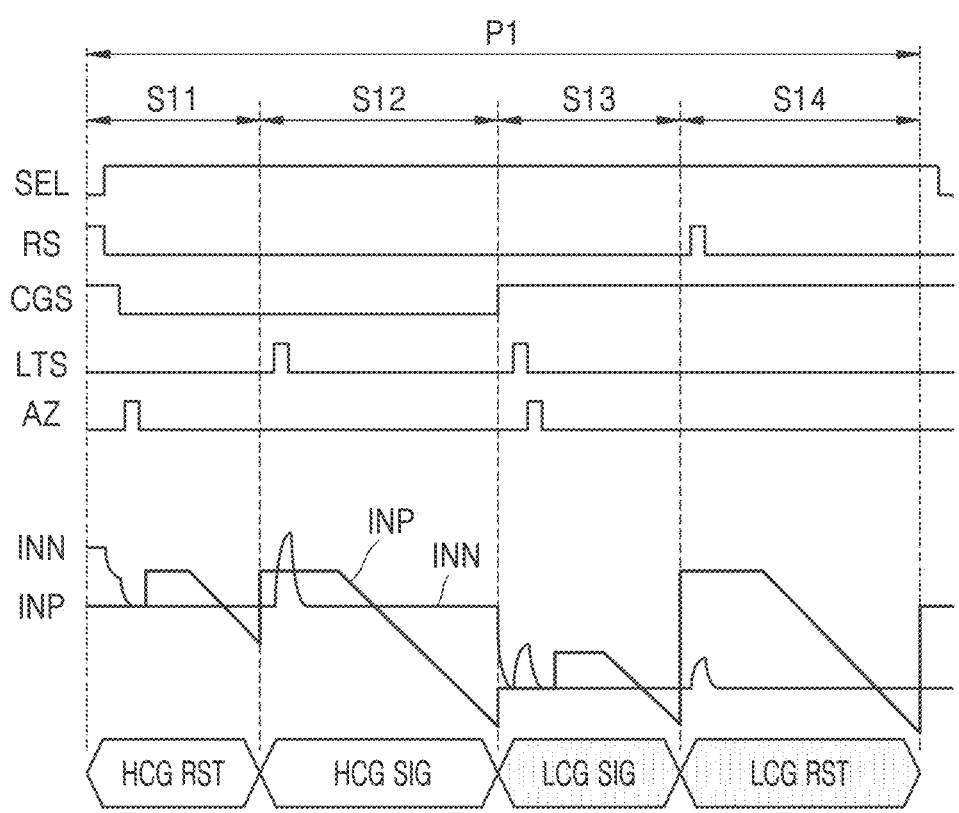
FIG. 7 is a timing diagram illustrating a pixel signal readout scheme of a pixel in a high conversion gain (HCG) mode and a low conversion gain (LCG) mode in an image sensor according to a comparative example of an image sensor according to various example embodiments.

FIG. 7 is a timing diagram illustrating a pixel signal readout scheme of a pixel in an HCG mode and an LCG mode in an image sensor according to a comparative example of an image sensor according to various example embodiments.

Referring to FIG. 7, in the image sensor according to the comparative example, one CDS circuit may read out the pixel PX. Accordingly, one CDS circuit may operate in response to the HCG mode and the LCG mode.

As described with reference to FIG. 6, the large photodiode LPD may be read out in the first period P1 of the readout period. The first period P1 may include first to fourth sub-periods S11, S12, S13 and S14, the HCG reset level may be read out in the first sub-period S11, the HCG signal level may be read out in the second sub-period S12, the LCG signal level may be read out in the third sub-period S13, and the LCG reset level may be read out in the fourth sub-period S14. The operation of the second period P2 in which the small photodiode SPD is read out is the same as the operation of the second period P2 of the image sensor according to the embodiment described above with reference to FIG. 6, and thus, repeated descriptions thereof are omitted.

In the comparative example, because one CDS circuit reads out both the HCG pixel signal and the LCG pixel signal, when the LCG pixel signal is read out after the HCG pixel signal is read out, a signal level other than a reset level is first read out. Thereafter, in response to the reset signal RS having an active level, the reset transistor RX may apply the reset voltage VRD to the first and second floating diffusion nodes FD1 and FD2 and thus the first and second floating diffusion nodes FD1 and FD2 may be reset, and then the LCG reset level may be read out. In this way, when a pixel signal is read out in the in-complete CDS method, the first and second floating diffusion nodes FD1 and FD2 are reset before the reset level is determined through the comparison operation of the CDS circuit. As a result, the correlation between the signal level and the reset level is lost. When a pixel signal is analog-to-digital converted into a pixel value, kT/C noise of the pixel PX may not be removed, and thus, signal-to-noise ratio (SNR) characteristics may not be good. Therefore, according to the comparative example, SNR characteristics may not be good when reading out the LCG pixel signal.

However, as described with reference to FIGS. 5A and 6, because the image sensor according to various example embodiments separately includes a first CDS circuit that operates in the LCG mode and is shared by two column lines and different CDS circuits operate in the HCG mode and the LCG mode, the pixel PX may be read out in a complete CDS method in the HCG mode and the LCG mode.

Figure 8:
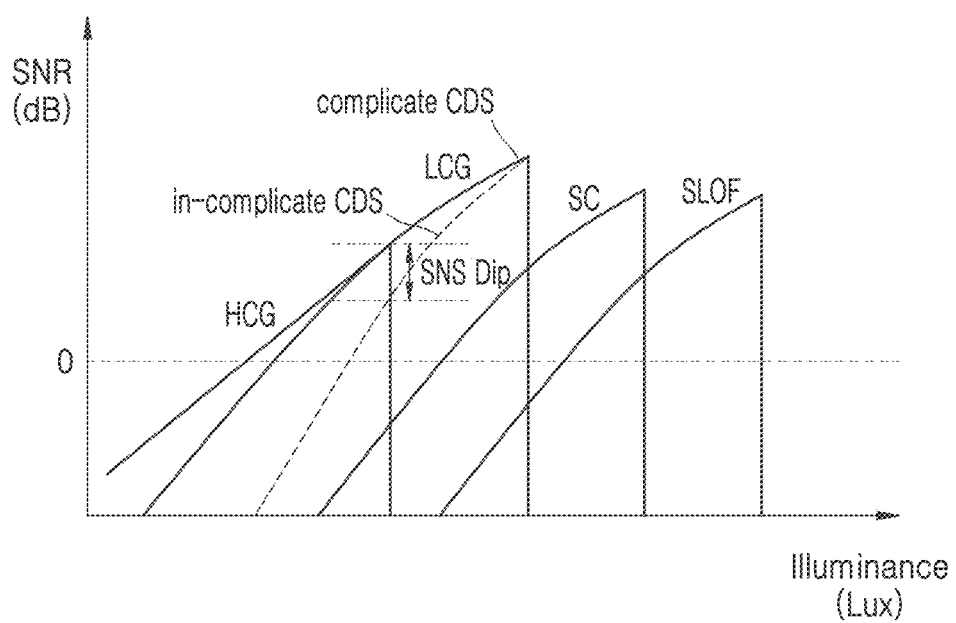
FIG. 8 illustrates signal-to-noise ratio (SNR) characteristics for each illuminance for a readout method of an image sensor according to various example embodiments and a readout method according to a comparative example.

FIG. 8 illustrates SNR characteristics for each illuminance for a readout method of an image sensor according to various example embodiments and a readout method according to a comparative example.

Referring to FIG. 8, the HCG mode corresponds to the lowest illuminance area, the LCG mode corresponds to the higher illuminance area than the HCG mode, the SLOF mode corresponds to the highest illuminance area, and the SC mode corresponds to the lower illuminance area than the SLOF mode.

An external processor, for example, an application processor, may generate an HDR image by synthesizing image data generated in each of the HCG mode, the LCG mode, the SC mode, and the SLOF mode.

As described with reference to FIG. 7, the image sensor according to the comparative example reads out an LCG pixel signal in the in-complete CDS method in the LCG mode, and the image sensor according to various example embodiments reads out an LCG pixel signal in the complete CDS method in the LCG mode.

When the LCG pixel signal is read out using the in-complete CDS method, an SNR dip may occur between the HCG mode and the LCG mode. The SNR dip between the HCG mode and the LCG mode may further increase as the analog gain of the HCG mode increases.

As described with reference to FIGS. 5 and 6, in the image sensor according to various example embodiments, as the first CDS circuit 131 reads out an LCG pixel signal and the second CDS circuit 132 reads out an HCG pixel signal, both the LCG pixel signal and the HCG pixel signal may be read out in the complete CDS method. Accordingly, the SNR characteristics of the LCG pixel signal is good, and the SNR dip between the HCG mode and the LCG mode may be reduced. As the SNR characteristics of the LCG mode are improved, the quality of the HDR image may be improved. Also, the reduced SNR dip between the HCG mode and the LCG mode makes it possible to use high analog gain in the HCG mode. Therefore, HDR performance may be improved by reducing quantization noise, and apparent sensitivity may be increased due to low-illuminance SNR improvement.

Figure 9A:
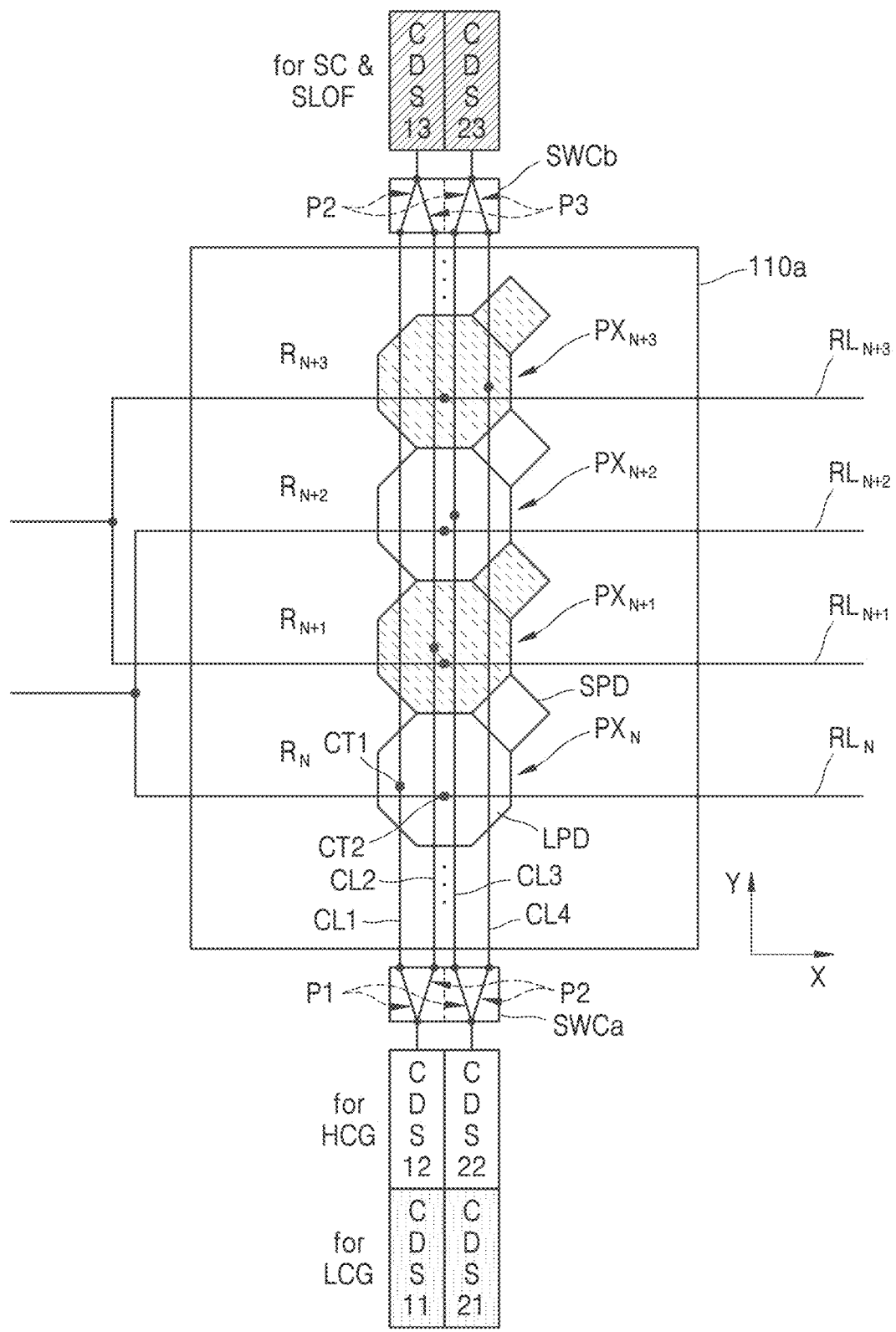
FIG. 9A illustrates connections between pixels and CDS circuits in an image sensor according to various example embodiments.
Figure 9B:
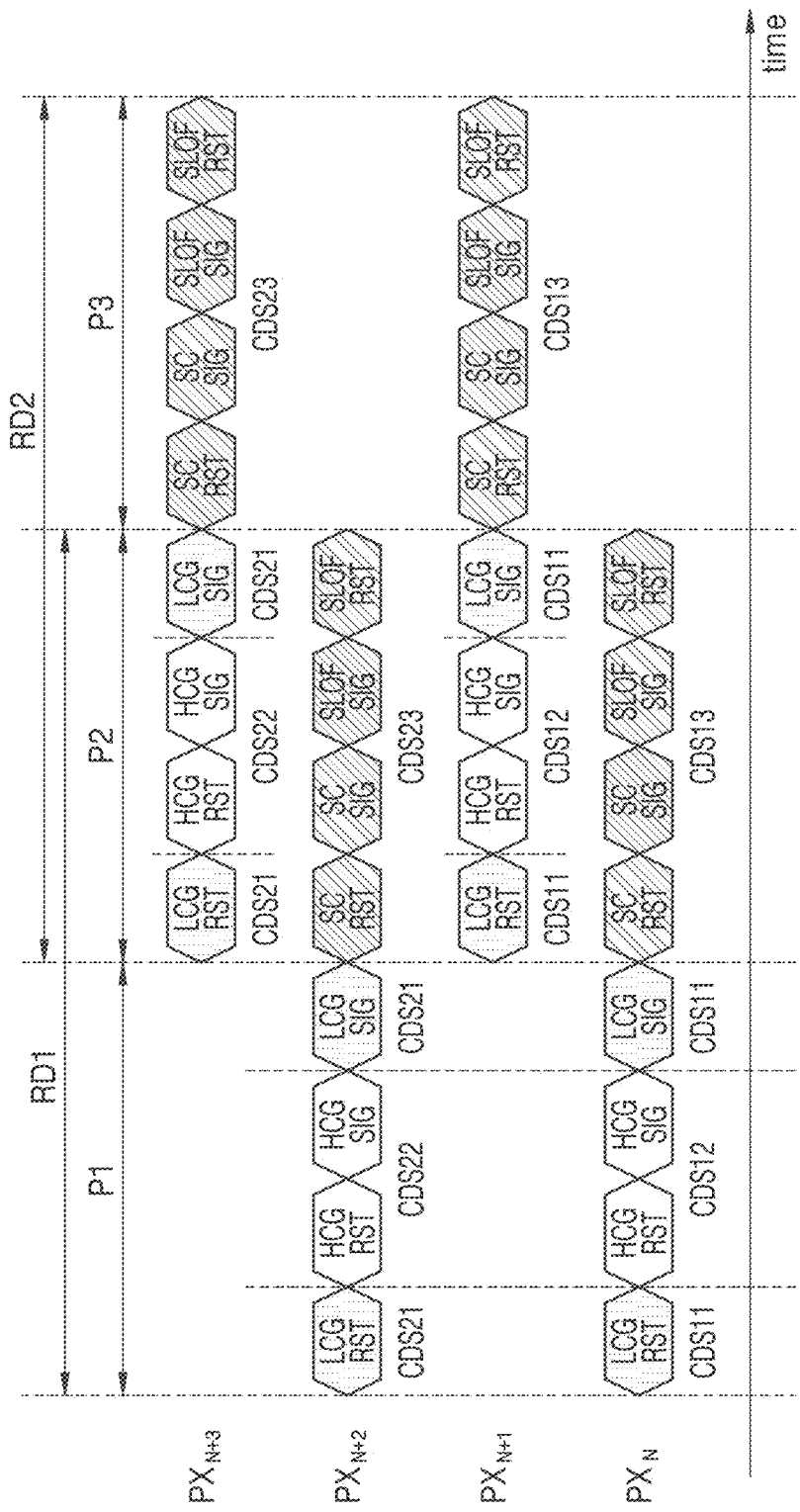
FIG. 9B is a timing diagram illustrating readout of pixels of FIG. 9A.

FIG. 9A illustrates connections between pixels and CDS circuits in an image sensor according to various example embodiments, and FIG. 9B is a timing diagram illustrating readout of pixels of FIG. 9A.

Referring to FIG. 9A, an Nth pixel $PX_N$, an (N+1)th pixel $PX_{N+1}$, an (N+2)th pixel $PX_{N+2}$, and an (N+3)th pixel $PX_{N+3}$ of a pixel array 110a may be arranged in the same column (the same position in an X-axis direction) and arranged in different rows, for example, an Nth row $R_N$, an (N+1)th row $R_{N+1}$, an (N+2)th row $R_{N+2}$, and an (N+3)th row $R_{N+3}$, respectively. The Nth pixel $PX_N$, the (N+1)th pixel $PX_{N+1}$, the (N+2)th pixel $PX_{N+2}$, and the (N+3)th pixel $PX_{N+3}$ may be respectively connected to different column lines, i.e., first to fourth column lines CL1, CL2, CL3, and CL4, through a first contact CT1.

Each of the Nth pixel $PX_N$, the (N+1)th pixel $PX_{N+1}$, the (N+2)th pixel $PX_{N+2}$, and the (N+3)th pixel $PX_{N+3}$ may be connected to a corresponding row line of a plurality of row lines $RL_N$, $RL_{N+1}$, $RL_{N+2}$, and $RL_{N+3}$ through a second contact CT2. The Nth pixel $PX_N$ and the (N+2)th pixel $PX_{N+2}$ may receive the same control signals (e.g., a selection signal, a transfer control signal, a conversion control signal, and a switch control signal) through the Nth row line $RL_N$ and the (N+2)th row line $RL_{N+2}$, respectively. The (N+1)th pixel $PX_{N+1}$ and the (N+3)th pixel $PX_{N+3}$ may receive the same control signals through the (N+1)th row line $RL_{N+1}$ and the (N+3)th row line $RL_{N+3}$, respectively. Here, although it is illustrated that one second contact CT2 and one row line are connected to each pixel, this is only for convenience of description. For example, a plurality of second contacts CT2 and a plurality of row lines may be connected to each pixel and the number of second contacts CT2 and row lines connected to each pixel may be determined according to the number of control signals.

Each of the Nth pixel $PX_N$, the (N+1)th pixel $PX_{N+1}$, the (N+2)th pixel $PX_{N+2}$, and the (N+3)th pixel $PX_{N+3}$ may include a large photodiode LPD and a small photodiode SPD, as described with reference to FIGS. 2A and 2B.

CDS circuits CDS11, CDS12, CDS13, CDS21, CDS22, and CDS23 may be disposed on both sides of the pixel array 110a. However, example embodiments are not limited thereto, and the CDS circuits CDS11, CDS12, CDS13, CDS21, CDS22, and CDS23 may be disposed on one side of the pixel array 110a.

The CDS circuits CDS11, CDS12, CDS13, CDS21, CDS22, and CDS23 may be connected to the first to fourth column lines CL1, CL2, CL3, and CL4 through switching circuits SWCa and SWCb (also referred to as multiplexers). The CDS circuits CDS11, CDS12, and CDS13 may be connected to the first and second column lines CL1 and CL2, and the CDS circuits CDS21, CDS22, and CDS23 may be connected to the third and fourth column lines CL3 and CL4. As described with reference to FIG. 5A, the switching circuits SWCa and SWCb may each include a plurality of switches, and during the readout periods of the Nth to (N+3)th pixels $PX_N$, $PX_{N+1}$, $PX_{N+2}$, and $PX_{N+3}$, the switching circuits SWCa and SWCb may time-divisionally connect the CDS circuits CDS11, CDS12, and CDS13 to the first and second column lines CL1 and CL2 and may time-divisionally connect the CDS circuits CDS21, CDS22, and CDS23 to the third and fourth column lines CL3 and CL4.

In a first period P1, which will be described below with reference to FIG. 9B, first CDS circuits CDS11 and CDS21 and second CDS circuits CDS12 and CDS22 may be connected to the first column line CL1 and the third column line CL2, respectively. For example, the CDS circuit CDS11 may be connected to the first column line CL1 during a period in which a pixel signal corresponding to an LCG reset level of the Nth pixel $PX_N$ is output, and then the CDS circuit CDS12 may be connected to the first column line CL1 during a period in which a pixel signal corresponding to an HCG reset level and an HCG signal level of the Nth pixel $PX_N$ is output. Thereafter, the CDS circuit CDS11 may be connected to the first column line CL1 again during a period in which a pixel signal corresponding to an LCG signal level of the Nth pixel $PX_N$ is output. As such, in the first period P1, the first CDS circuits CDS11 and CDS21 and the second CDS circuits CDS12 and CDS22 may be time-divisionally connected to the first column line CL1 and the third column line CL2, respectively.

In a second period P2, third CDS circuits CDS13 and CDS23 may be connected to the first column line CL1 and the third column line CL2, respectively. Also, during the second period P2, the first CDS circuits CDS11 and CDS21 and the second CDS circuits CDS12 and CDS22 may be connected to the second column line CL2 and the fourth column line CL4, respectively. Thereafter, in a third period P3, the third CDS circuits CDS13 and CDS23 may be connected to the second column line CL2 and the fourth column line CL4, respectively.

Accordingly, the first and second column lines CL1 and CL2 may share the CDS circuits CDS11, CDS12, and CDS13, and the third and fourth column lines CL3 and CL4 may share the CDS circuits CDS21, CDS22 and CDS23.

The first CDS circuits CDS11 and CDS21 may read out a pixel signal of the LCG mode, the second CDS circuits CDS12 and CDS22 may read out a pixel signal of the HCG mode, and the third CDS circuits CDS13 and CDS22 may read out pixel signals of the SC mode and the SLOF mode. For example, the first CDS circuits CDS11 and CDS21 and second CDS circuits CDS12 and CDS22 positioned under the pixel array 110a may read out pixel signals according to the large photodiode LPD, and the third CDS circuits CDS13 and CDS23 positioned above the pixel array 110a may read out pixel signals according to the small photodiode SPD.

Referring to FIG. 9B, in a first readout period RD1, pixels connected to the first and third column lines CL1 and CL3, for example, the Nth pixel $PX_N$ and the (N+2)th pixel $PX_{N+2}$, may be read out. In a second readout period RD2, pixels connected to the second and fourth column lines CL2 and CL4, for example, the (N+1)th pixel $PX_{N+1}$ and the (N+3)th pixel $PX_{N+3}$, may be read out. The first readout period RD1 includes a first period P1 and a second period P2, and the second readout period RD2 includes the second period P2 and a third period P3. A portion (the second period P2) of the first readout period RD1 and a portion (the second period P2) of the second readout period RD2 may overlap each other.

In the first period P1, an LCG reset level LCG_RST, an HCG reset level HCG_RST, an HCG signal level HCG_SIG, and an LCG signal level LCG_SIG of each of the Nth pixel $PX_N$ and the (N+2)th pixel $PX_{N+2}$ may be sequentially read out, and the first CDS circuits CDS11 and CDS21 may read out the LCG reset level LCG_RST and the LCG signal level LCG_SIG. The second CDS circuits CDS12 and CDS22 may read out the HCG reset level HCG_RST and the HCG signal level HCG_SIG.

In the second period P2, the third CDS circuits CDS13 and CDS23 may sequentially read out an SC reset level SC_RST, an SC signal level SC_SIG, an SLOF signal level SLOF_SIG, and an SLOF reset level SLOF_RST of each of the Nth pixel $PX_N$ and the (N+2)th pixel $PX_{N+2}$. Also, in the second period P2, the first CDS circuits CDS11 and CDS21 may sequentially read out an LCG reset level LCG_RST, an HCG reset level HCG_RST, an HCG signal level HCG_SIG, and an LCG signal level LCG_SIG of each of the (N+1)th pixel $PX_{N+1}$ and the (N+3)th pixel $PX_{N+3}$.

In the third period P3, the third CDS circuits CDS13 and CDS23 may sequentially read out an SC reset level SC_RST, an SC signal level SC_SIG, an SLOF signal level SLOF_SIG, and an SLOF reset level SLOF_RST of each of the (N+1)th pixel $PX_{N+1}$ and the (N+3)th pixel $PX_{N+3}$.

As shown in FIG. 9A, the Nth pixel $PX_N$ and the (N+2)th pixel $PX_{N+2}$ respectively disposed in the Nth row $R_N$ and the (N+2)th row $R_{N+2}$ receive the same control signals, and the (N+1)th pixel $PX_{N+1}$ and the (N+3)th pixel $PX_{N+3}$ respectively disposed in the (N+1)th row $R_{N+1}$ and the (N+3)th row $R_{N+3}$ receive the same control signals. Accordingly, as shown in FIG. 9B, the Nth pixel $PX_N$ and the (N+2)th pixel $PX_{N+2}$ are simultaneously read out, and the (N+1)th pixel $PX_{N+1}$ and the (N+3)th pixel $PX_{N+3}$ are simultaneously read out. Because the first column line CL1 and the second column line CL2 respectively connected to the Nth pixel $PX_N$ and the (N+1)th pixel $PX_{N+1}$ share the CDS circuits CDS11, CDS12, and CDS13 and the third column line CL3 and the fourth column line CL4 respectively connected to the (N+2)th pixel $PX_{N+2}$ and the (N+3)th pixel $PX_{N+3}$ share the CDS circuits CDS21, CDS22, and CDS23, the N pixel $PX_N$ and the (N+2)th pixel $PX_{N+2}$, and the (N+1)th pixel $PX_{N+1}$ and the (N+3)th pixel $PX_{N+3}$ may be simultaneously read out. Alternatively or additionally, a time point at which the N pixel $PX_N$ and the (N+2)th pixel $PX_{N+2}$ are read out, and a time point at which the (N+1)th pixel $PX_{N+1}$ and the (N+3)th pixel $PX_{N+3}$ are read out may be staggered.

Figure 10A:
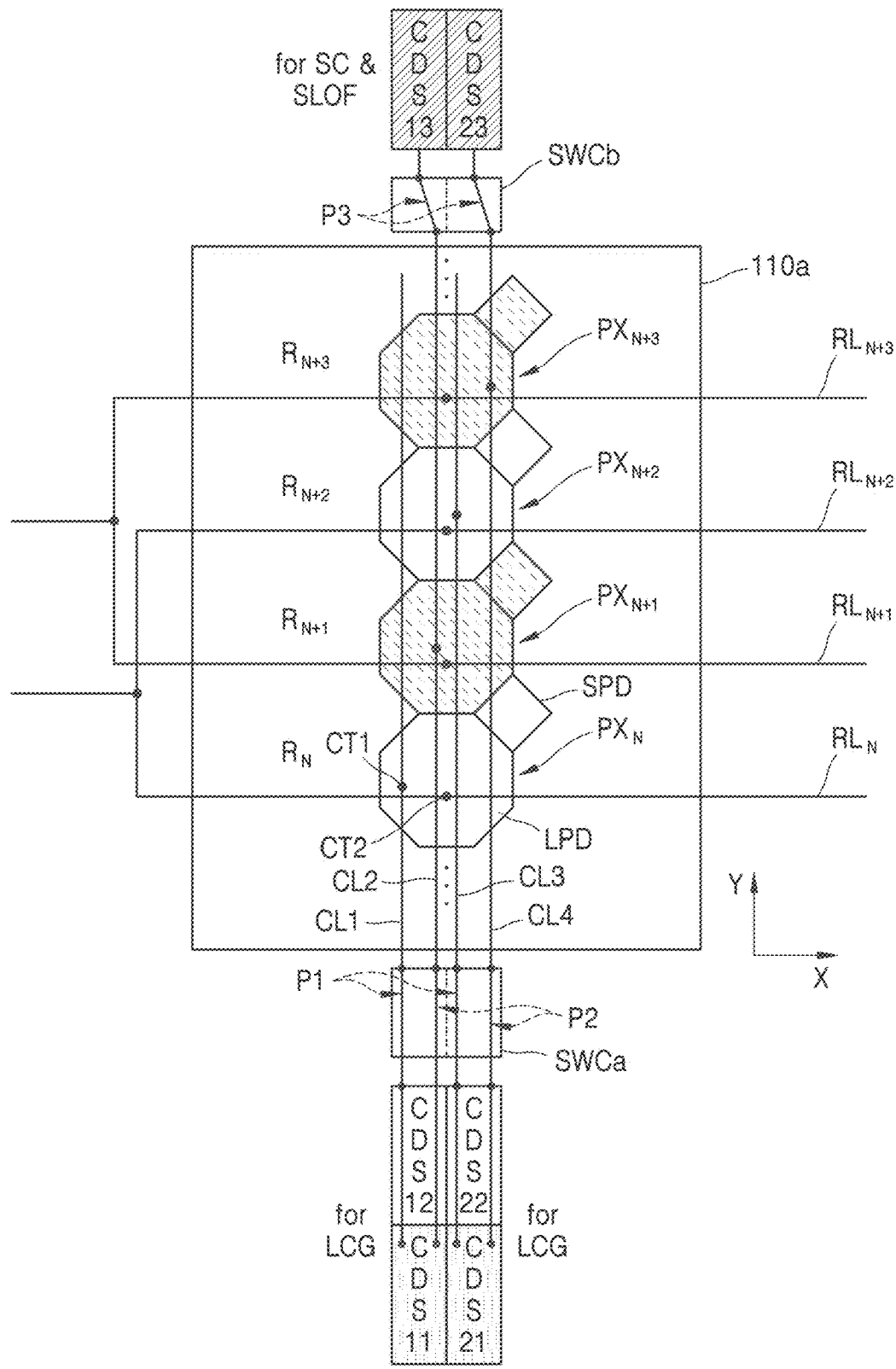
FIG. 10A illustrates connections between pixels and CDS circuits in an image sensor according to various example embodiments.
Figure 10B:
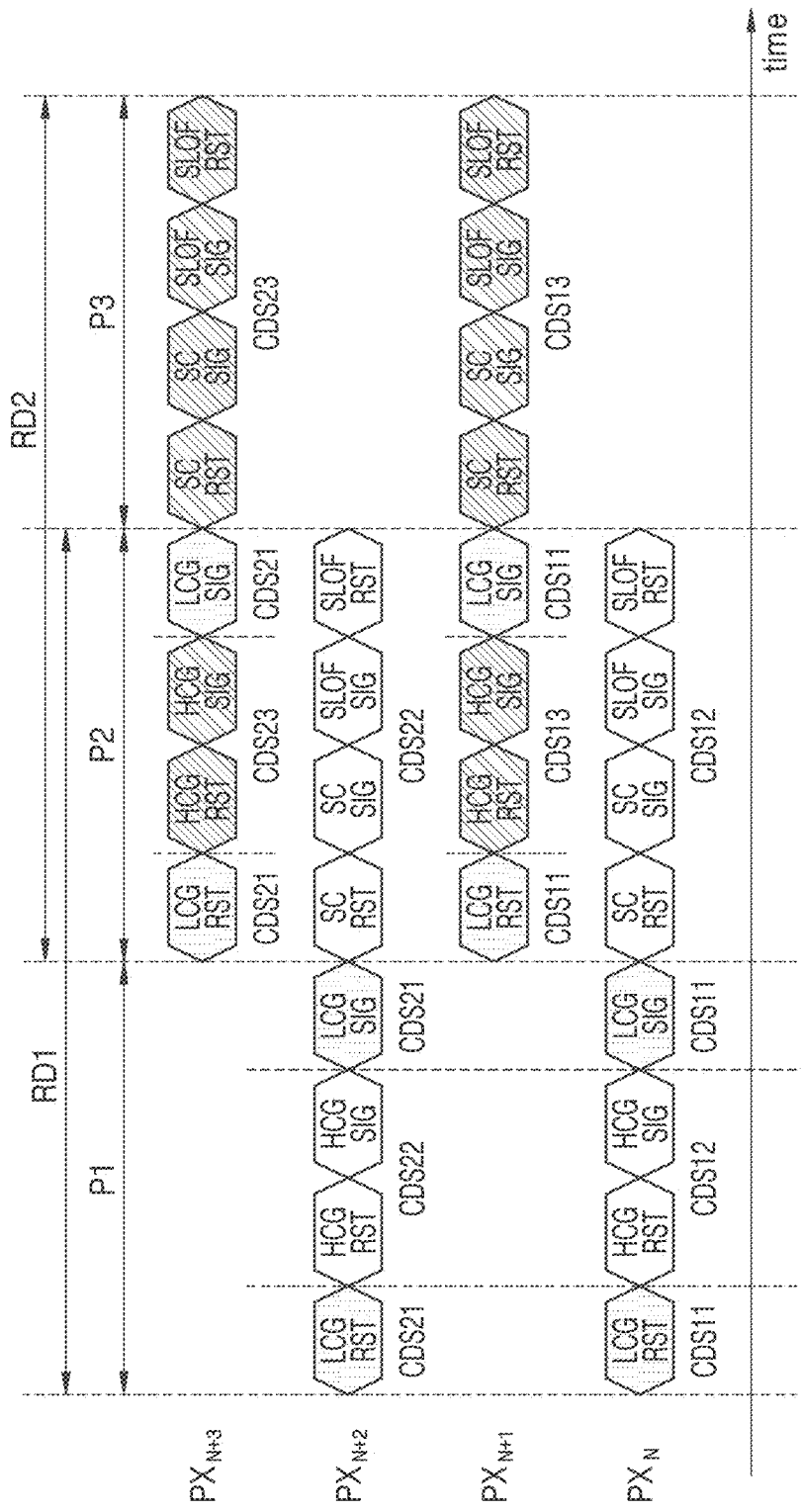
FIG. 10B is a timing diagram illustrating readout of pixels of FIG. 10A.

FIG. 10A illustrates connections between pixels and CDS circuits in an image sensor according to various example embodiments, and FIG. 10B is a timing diagram illustrating readout of pixels of FIG. 10A.

The descriptions of the pixel array 110a, the arrangement of CDS circuits, and the switch circuits SWCa and SWCb, given with reference to FIG. 9A, and the readout operation of the pixels of FIG. 9A may be similarly applied to FIGS. 10A and 10B, and thus, repeated descriptions thereof will be omitted and differences will be described.

In a first period P1, which will be described below with reference to FIG. 10B, first CDS circuits CDS11 and CDS21 and second CDS circuits CDS12 and CDS22 may be connected to a first column line CL1 and a third column line CL2, respectively. In a second period P2, the second CDS circuits CDS12 and CDS22 may be connected to the first column line CL1 and the third column line CL2, respectively. Also, in the second period P2, the first CDS circuits CDS11 and CDS21 and third CDS circuits CDS13 and CDS23 may be connected to a second column line CL2 and a fourth column line CL4, respectively. In a third period P3, the third CDS circuits CDS13 and CDS23 may be connected to the second column line CL2 and the fourth column line CL4, respectively.

As such, the first and second column lines CL1 and CL2 may share the first CDS circuit CDS11, and the third and fourth column lines CL3 and CL4 may share the first CDS circuit CDS21. The first CDS circuits CDS11 and CDS21 may read out a pixel signal of an LCG mode of each of an Nth pixel $PX_N$ and an (N+2)th pixel $PX_{N+2}$ in the first period P1, and may read out a pixel signal of an LCG mode of each of an (N+1)th pixel $PX_{N+1}$ and an (N+3)th pixel $PX_{N+3}$ in the second period P2. The second CDS circuits CDS12 and CDS22 may read out a pixel signal of an HCG mode of each of the Nth pixel $PX_N$ and the (N+2)th pixel $PX_{N+2}$ in the first period P1, and may read out pixel signals of an SC mode and an SLOF mode of each of the Nth pixel $PX_N$ and the (N+2)th pixel $PX_{N+2}$ in the second period P2. The third CDS circuits CDS13 and CDS23 may read out a pixel signal of an HCG mode of each of the (N+1)th pixel $PX_{N+1}$ and the (N+3)th pixel $PX_{N+3}$ in the second period P2, and may read out pixel signals of an SC mode and an SLOF mode of each of the (N+1)th pixel $PX_{N+1}$ and the (N+3)th pixel $PX_{N+3}$ in the third period P3.

For example, the second CDS circuit CDS12 and the third CDS circuit CDS13 may respectively read out pixels connected to the first column line CL1 and the second column line CL2, for example, the Nth pixel PX N and the (N+1)th pixel PX N+1, but the first CDS circuit CDS11 may be shared by the first column line CL1 and the second column line CL2 and thus may read out an LCG pixel signal of each of the Nth pixel PX N and the (N+1)th pixel $PX_{N+1}$. Also, the second CDS circuit CDS12 and the third CDS circuit CDS13 may respectively read out pixels connected to the third column line CL1 and the fourth column line CL2, for example, the (N+2)th pixel PX N+2 and the (N+3)th pixel PX N+3, but the first CDS circuit CDS11 may be shared by the third column line CL3 and the fourth column line CL4 and thus may read out an LCG pixel signal of each of the (N+2)th pixel $PX_{N+2}$ and the (N+3)th pixel $PX_{N+3}$ connected to the third column line CL3 and the fourth column line CL4.

Because the first CDS circuit CDS11 is shared by the first column line CL1 and the second column line CL2, that is, because the first CDS circuit CDS11 is time-divisionally connected to the first column line CL1 and the second column line CL1, the Nth pixel $PX_N$ and the (N+1)th pixel $PX_{N+1}$ may be read out staggered. Because the first CDS circuit CDS21 is shared by the third column line CL3 and the fourth column line CL4, that is, because the first CDS circuit CDS21 is time-divisionally connected to the third column line CL3 and the fourth column line CL4, the (N+2)th pixel $PX_{N+2}$ and the (N+3)th pixel $PX_{N+3}$ may be read out staggered.

As described with reference to FIGS. 9A and 10A, in the image sensor according to various example embodiments, two adjacent column lines, for example, the first and second column lines CL1 and CL2 and the third and fourth column lines CL3 and CL4 may share the first CDS circuits CDS11 and CDS21 for reading out an LCG pixel signal and read out pixels in a staggered manner. Accordingly, the layout area of CDS circuits may be reduced compared to a case in which CDS circuits corresponding to each of the first to fourth column lines CL1, CL2, CL3, and CL4 to read out the LCG pixel signal is provided.

Figure 11A:
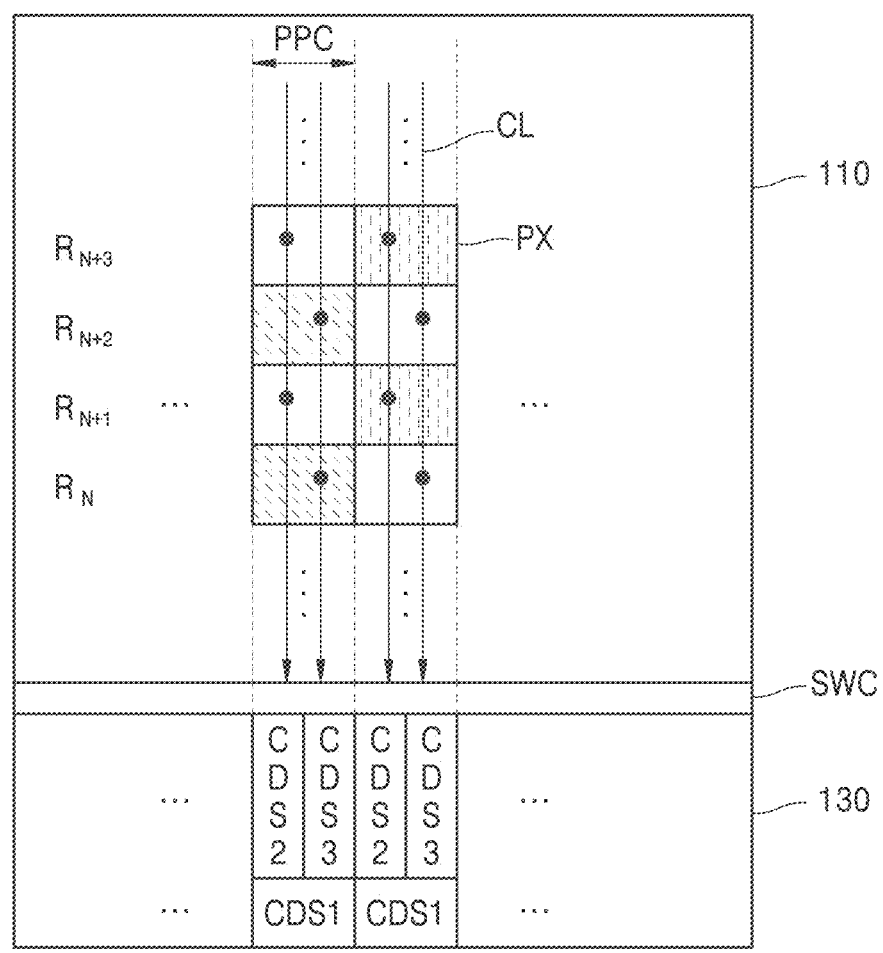
FIGS. 11A and 11B illustrate connections between pixels and CDS circuits in an image sensor according to various example embodiments.
Figure 11B:
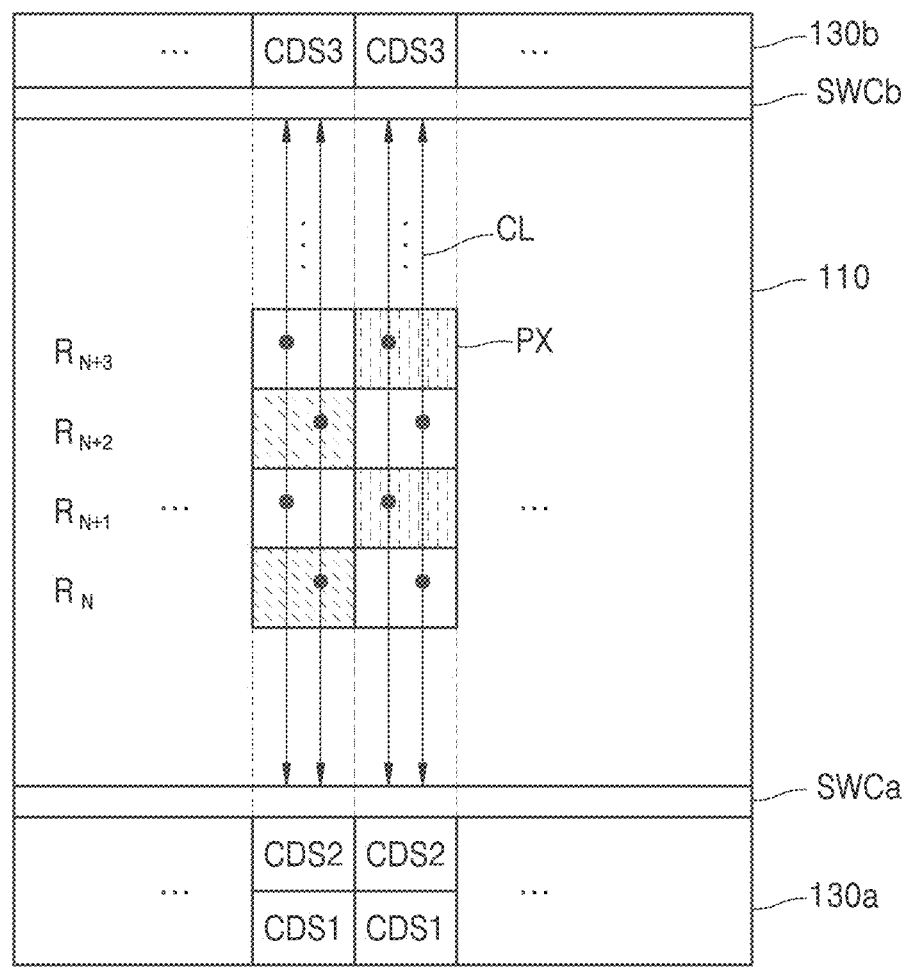
Figure 11C:
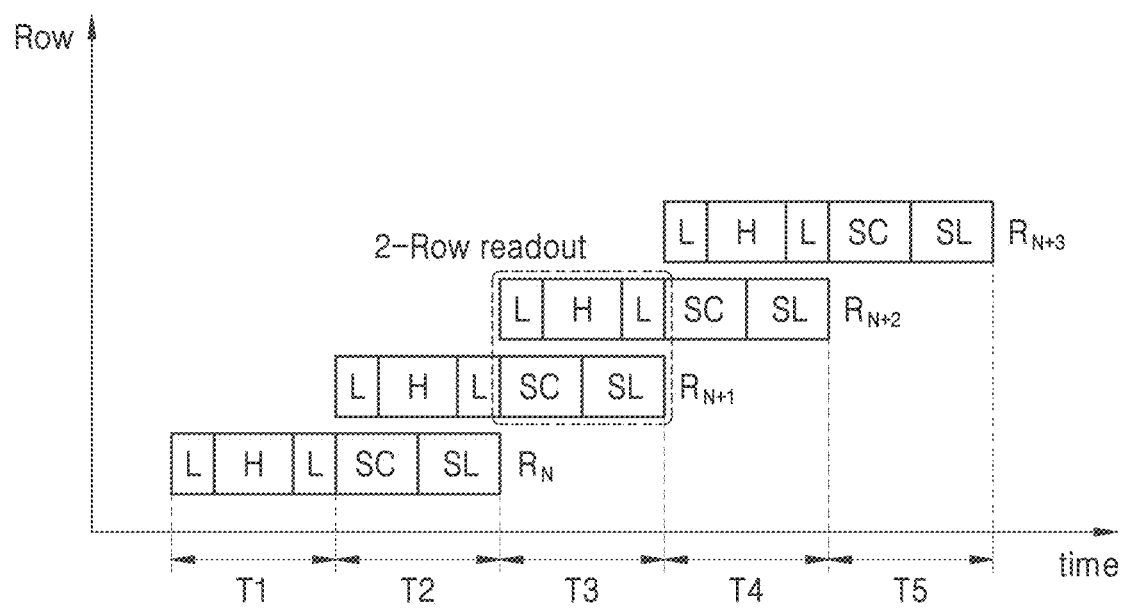
FIG. 11C is a timing diagram illustrating readout of pixels of FIGS. 11A and 11B.

FIGS. 11A and 11B illustrate connections between pixels and CDS circuits in an image sensor according to various example embodiments, and FIG. 11C is a timing diagram illustrating readout of pixels of FIGS. 11A and 11B.

Referring to FIG. 11A, an ADC circuit 130 may be disposed on one side of a pixel array 110 and include first CDS circuits CDS1, second CDS circuits CDS2, and third CDS circuits CDS3. The first to third CDS circuits CDS1, CDS2, and CDS3 may be disposed for each pixel pitch PPC.

In the pixel array 110, pixels PX arranged in the same column may be alternately connected to two adjacent column lines CL. A switch circuit SWC may be disposed between the pixel array 110 and the ADC circuit 130 and time-divisionally connect two column lines to the first to third CDS circuits CDS1, CDS2, and CDS3.

Referring to FIG. 11B, ADC circuits 130a and 130b may be disposed on opposite sides of a pixel array 110. In addition, first CDS circuits CDS1 and second CDS circuits CDS2 may be disposed on one side of the pixel array 110, and third CDS circuits CDS3 may be disposed on the other side of the pixel array 110. A switch circuit SWCa may be disposed between the pixel array 110 and the ADC circuit 130a, and may connect two column lines to the first and second CDS circuits CDS1 and CDS2 in a time-division manner A switch circuit SWb may be disposed between the pixel array 110 and the ADC circuit 130b, and may connect two column lines to the third CDS circuits CDS3 in a time-division manner.

Referring to FIG. 11C, pixels disposed in a plurality of rows of the pixel array 110, for example, Nth to (N+3)th rows $R_N$, $R_{N+1}$, $R_{N+2}$, and $R_{N+3}$, may be read out staggered.

In a period T1, the first CDS circuits CDS1 and the second CDS circuits CDS2 may read out a pixel signal L of an LCG mode and a pixel signal H of an HCG mode from pixels PX arranged in the Nth row $R_N$. In a period T2, the third CDS circuits CDS3 (or the second CDS circuits CDS2) may read out a pixel signal SC of an SC mode and a pixel signal SL of an SLOF mode from the pixels PX arranged in the Nth row $R_N$. In this case, the first CDS circuits CDS1 and the second CDS circuits CDS2 (or the third CDS circuits CDS3) may read out a pixel signal L of an LCG mode and a pixel signal H of an HCG mode from pixels PX arranged in the (N+1)th row $R_{N+1}$.

In a period T3, the third CDS circuits CDS3 may read out a pixel signal SC of an SC mode and a pixel signal SL of an SLOF mode from the pixels PX arranged in the (N+1)th row $R_{N+1}$. In this case, the first CDS circuits CDS1 and the second CDS circuits CDS2 may read out a pixel signal L of an LCG mode and a pixel signal H of an HCG mode from pixels PX arranged in the (N+2)th row $R_{N+2}$.

In this way, the first CDS circuit CDS1 may be shared by two adjacent column lines CL, or the first to third CDS circuits CDS1, CDS2, and CDS3 may be shared by two adjacent column lines CL, and thus, pixels PX arranged in a plurality of rows may be read out staggered. Also, because pixels arranged in two rows are simultaneously read out, a frame rate may be increased.

Figure 12A:
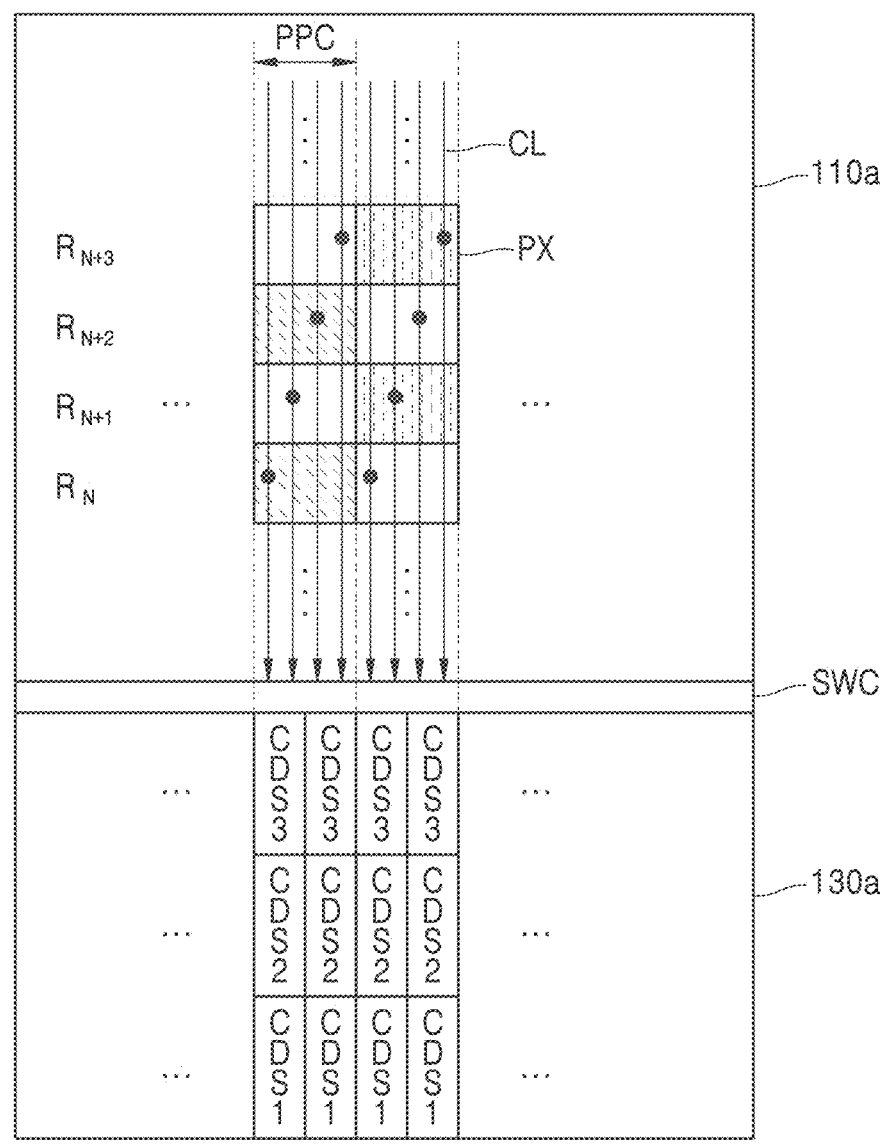
FIGS. 12A and 12B illustrate connections between pixels and CDS circuits in an image sensor according to various example embodiments.
Figure 12B:
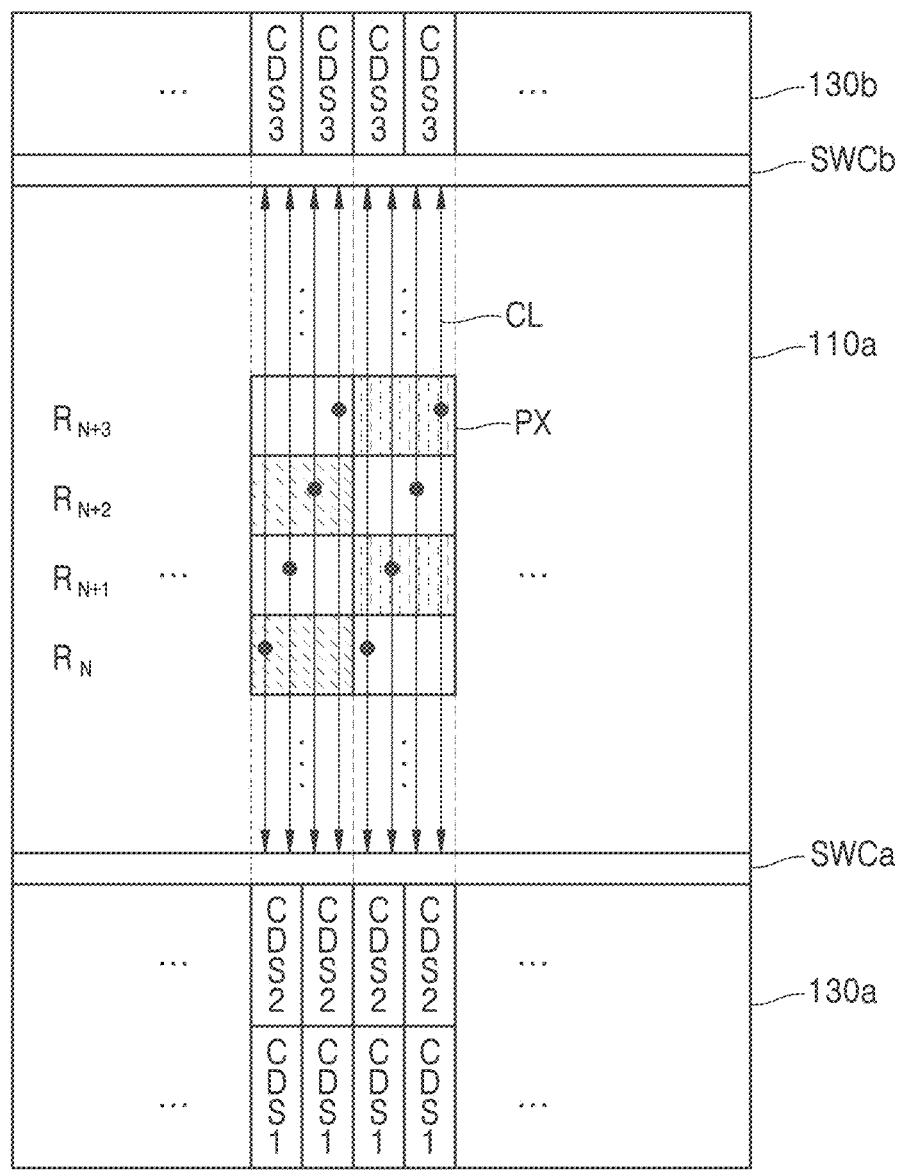
Figure 12C:
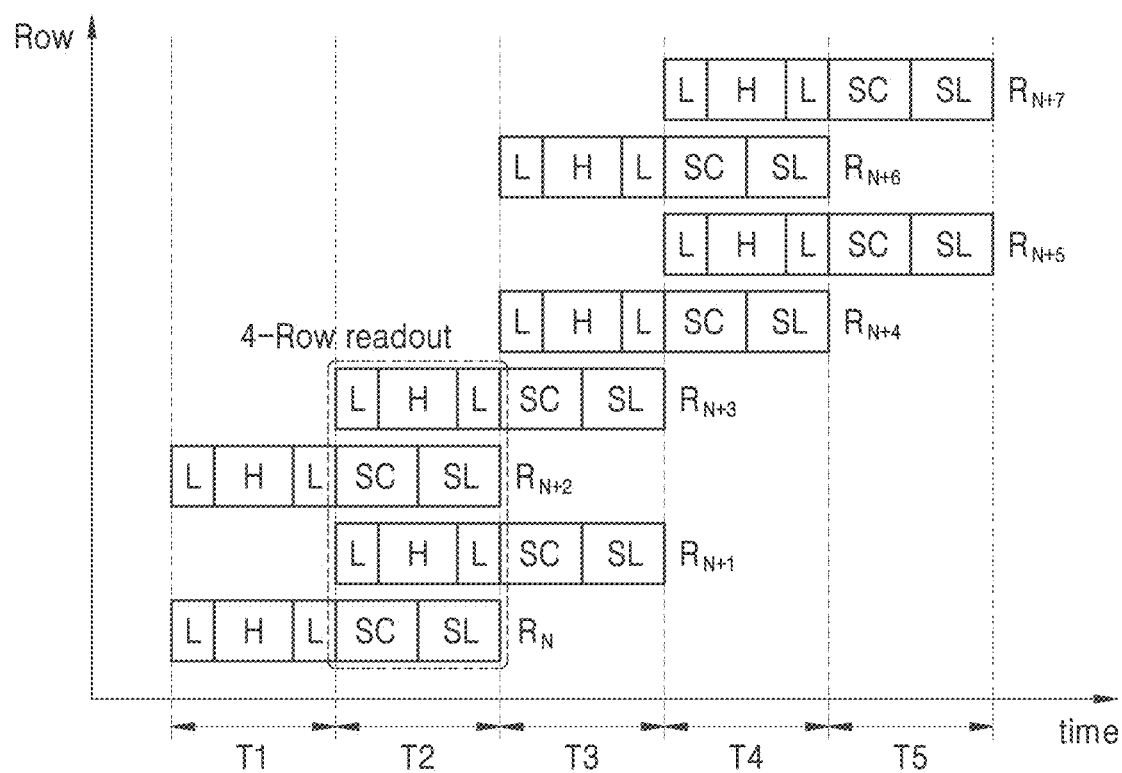
FIG. 12C is a timing diagram illustrating readout of pixels of FIGS. 12A and 12B.

FIGS. 12A and 12B illustrate connections between pixels and CDS circuits in an image sensor according to various example embodiments, and FIG. 12C is a timing diagram illustrating readout of pixels of FIGS. 12A and 12B.

Referring to FIG. 12A, an ADC circuit 130a may be disposed on one side of a pixel array 110a and include first CDS circuits CDS1, second CDS circuits CDS2, and third CDS circuits CDS3. Two pairs of first to third CDS circuits CDS1, CDS2, and CDS3 may be arranged for each pixel pitch PPC.

In the pixel array 110a, pixels PX arranged in the same column may be alternately connected to four adjacent column lines CL. A switch circuit SWC may be disposed between the pixel array 110a and the ADC circuit 130a and time-divisionally connect two column lines to the first to third CDS circuits CDS1, CDS2, and CDS3.

Referring to FIG. 12B, ADC circuits 130a and 130b may be disposed on opposite sides of a pixel array 110a. In addition, first CDS circuits CDS1 and second CDS circuits CDS2 may be disposed on one side of the pixel array 110a, and third CDS circuits CDS3 may be disposed on the other side of the pixel array 110a. A switch circuit SWCa may be disposed between the pixel array 110a and the ADC circuit 130a, and may connect two column lines to the first and second CDS circuits CDS1 and CDS2 in a time-division manner A switch circuit SWb may be disposed between the pixel array 110a and the ADC circuit 130b, and may connect two column lines to the third CDS circuits CDS3 in a time-division manner.

Referring to FIG. 12C, pixels arranged in a plurality of rows of the pixel array 110a, for example, Nth to (N+3)th rows $R_N$, $R_{N+1}$, $R_{N+2}$, and $R_{N+3}$, may be read out staggered.

In a period T1, the first CDS circuits CDS1 and the second CDS circuits CDS2 may read out a pixel signal L of an LCG mode and a pixel signal H of an HCG mode from pixels PX arranged in the Nth row $R_N$ and the (N+2)th row $R_{N+2}$. In a period T2, the third CDS circuits CDS3 (or the second CDS circuits CDS2) may read out a pixel signal SC of an SC mode and a pixel signal SL of an SLOF mode from the pixels PX arranged in the Nth row $R_N$ and the (N+2)th row $R_{N+2}$. In this case, the first CDS circuits CDS1 and the second CDS circuits CDS2 (or the third CDS circuits CDS3) may read out a pixel signal L of an LCG mode and a pixel signal H of an HCG mode from pixels PX arranged in the (N+1)th row $R_{N+1}$ and the (N+3)th row $R_{N+3}$.

In a period T3, the third CDS circuits CDS3 may read out a pixel signal SC of an SC mode and a pixel signal SL of an SLOF mode from the pixels PX arranged in the (N+1)th row $R_{N+1}$ and the (N+3)th row $R_{N+3}$. In this case, the first CDS circuits CDS1 and the second CDS circuits CDS2 may read out a pixel signal L of an LCG mode and a pixel signal H of an HCG mode from pixels PX arranged in the (N+4)th row $R_{N+4}$ and the (N+6)th row $R_{N+6}$.

In this way, the first CDS circuit CDS1 may be shared by two adjacent column lines CL, or the first to third CDS circuits CDS1, CDS2, and CDS3 may be shared by two adjacent column lines CL, and thus, pixels PX arranged in a plurality of rows may be read out staggered. Alternatively or additionally, because pixels arranged in four rows are simultaneously read out, a frame rate may be increased.

Figure 13A:
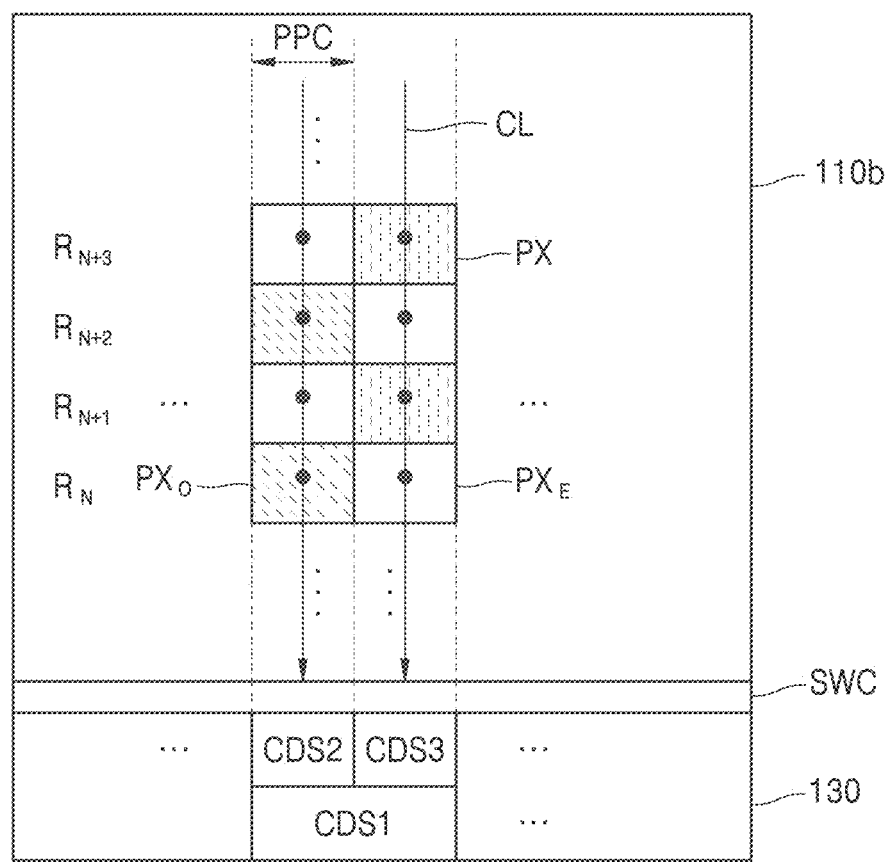
FIG. 13A illustrates connections between pixels and CDS circuits in an image sensor according to various example embodiments.
Figure 13B:
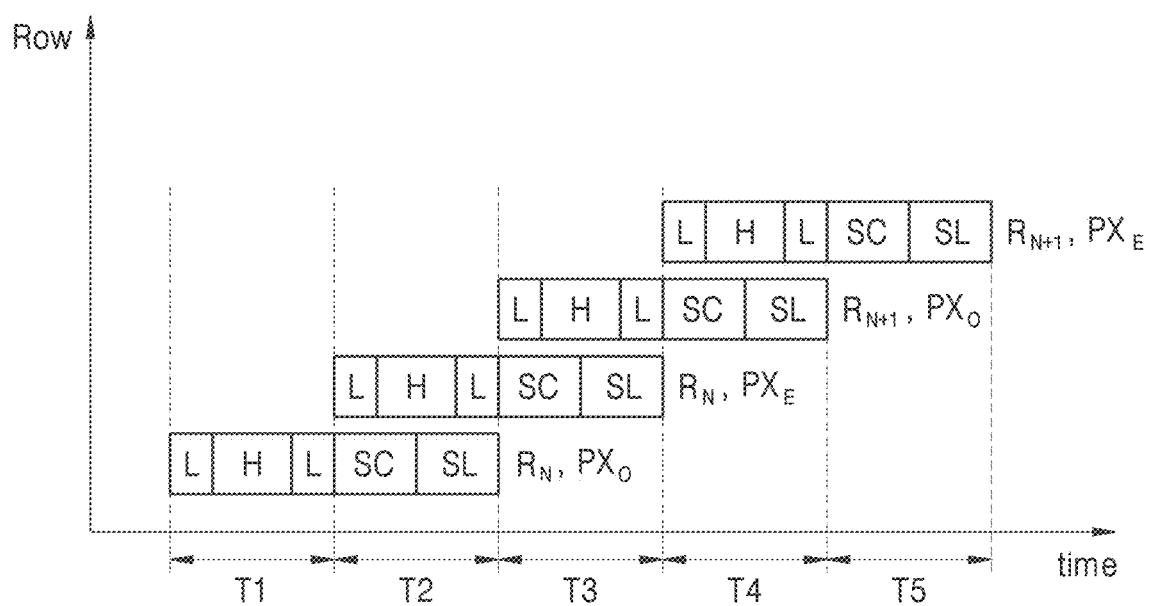
FIG. 13B is a timing diagram illustrating readout of pixels of FIG. 13A.

FIG. 13A illustrates connections between pixels and CDS circuits in an image sensor according to various example embodiments, and FIG. 13B is a timing diagram illustrating readout of pixels of FIG. 13A.

Referring to FIG. 13A, an ADC circuit 130 may be disposed on one side of a pixel array 110b and include first CDS circuits CDS1, second CDS circuits CDS2, and third CDS circuits CDS3. The first to third CDS circuits CDS1, CDS2, and CDS3 may be disposed for each two pixel pitches PPC.

In the pixel array 110b, pixels PX arranged in the same column may be connected to the same column line CL. A switch circuit SWC may be disposed between the pixel array 110c and the ADC circuit 130, and may connect two column lines to the first to third CDS circuits CDS1, CDS2, and CDS3 in a time-division manner.

Referring to FIG. 13B, pixels arranged in a plurality of rows of the pixel array 110b, for example, Nth to (N+3)th rows $R_N$, $R_{N+1}$, $R_{N+2}$, and $R_{N+3}$, may be read out staggered.

In a period T1, the first CDS circuits CDS1 and the second CDS circuits CDS2 may read out a pixel signal L of an LCG mode and a pixel signal H of an HCG mode from pixels $PX_O$ arranged in an odd-numbered column of the Nth row $R_N$. In a period T2, the third CDS circuits CDS3 (or the second CDS circuits CDS2) may read out a pixel signal SC of an SC mode and a pixel signal SL of an SLOF mode from the pixels $PX_O$ arranged in the odd-numbered column of the Nth row $R_N$. In this case, the first CDS circuits CDS1 and the second CDS circuits CDS2 (or the third CDS circuits CDS3) may read out a pixel signal L of an LCG mode and a pixel signal H of an HCG mode from pixels PX E arranged in an even-numbered column of the Nth row $R_N$.

In a period T3, the third CDS circuits CDS3 may read out a pixel signal SC of an SC mode and a pixel signal SL of an SLOF mode from the pixels PX arranged in the even-numbered column of the Nth row $R_N$. In this case, the first CDS circuits CDS1 and the second CDS circuits CDS2 may read out a pixel signal L of an LCG mode and a pixel signal H of an HCG mode from pixels $PX_O$ arranged in an odd-numbered column of the (N+1)th row $R_{N+1}$.

In this way, the first CDS circuit CDS1 may be shared by two adjacent column lines CL (for example, an odd-numbered column line and an even-numbered column lines), or the first to third CDS circuits CDS1, CDS2, and CDS3 may be shared by two adjacent column lines CL, and thus, pixels $PX_O$ arranged in odd-numbered columns of a plurality of rows and pixels PX E arranged in even-numbered columns thereof may be read out staggered.

Figure 14A:
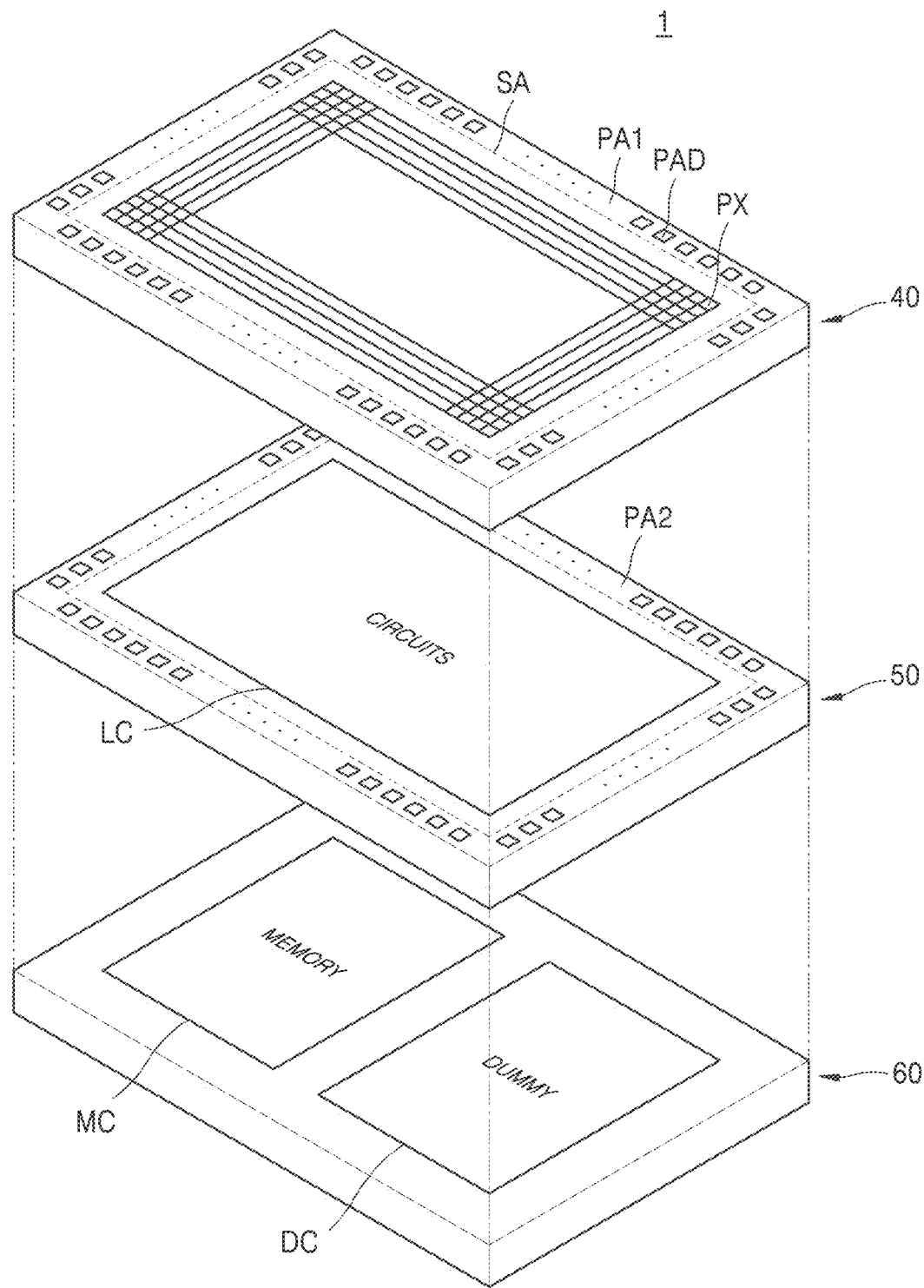
FIGS. 14A and 14B illustrate stack structures of image sensors according to various example embodiments.
Figure 14B:
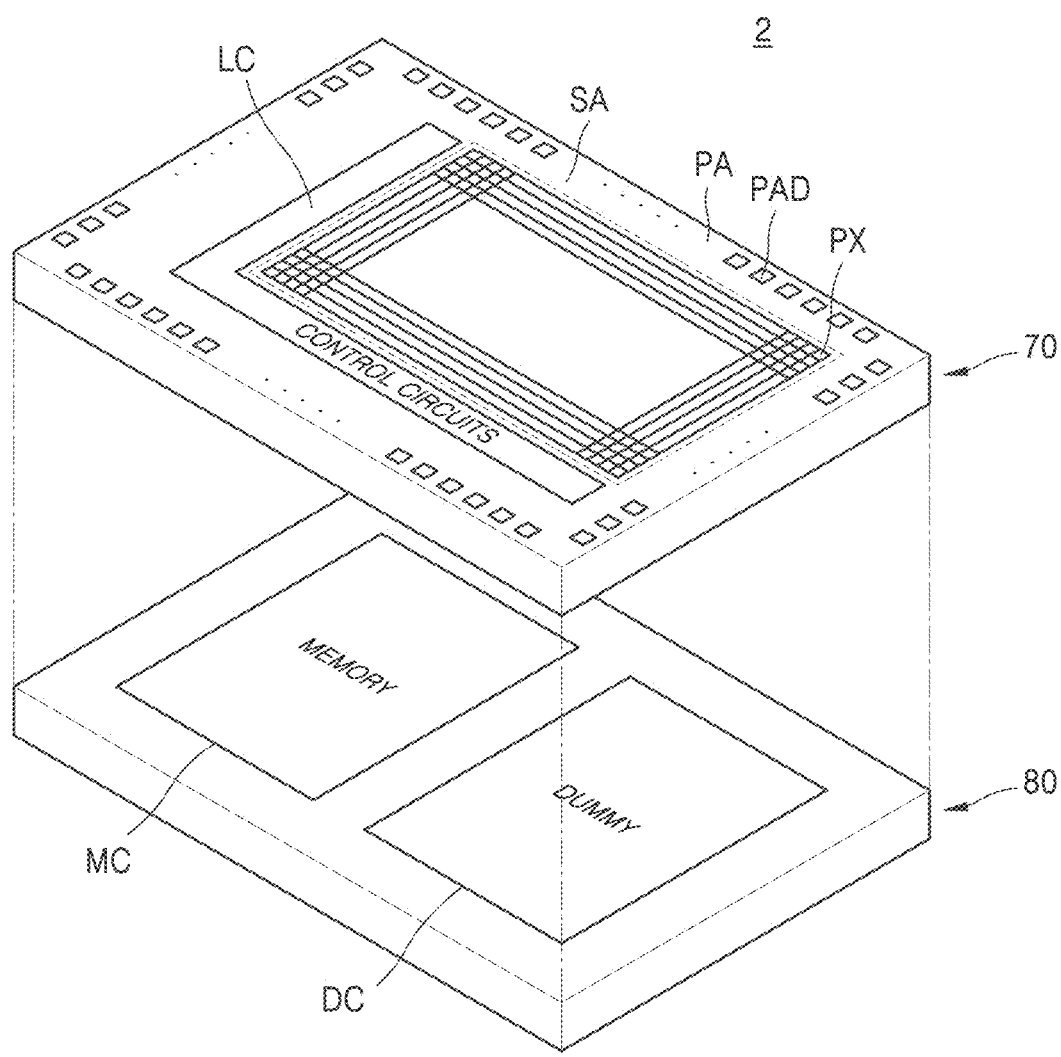

FIGS. 14A and 14B illustrate stack structures of image sensors according to various example embodiments.

Referring to FIG. 14A, an image sensor 1 according to various example embodiments may include a plurality of stacked chips. For example, the image sensor 1 may include an upper chip 40 including a pixel array area or sensing area SA, a intermediate chip 50 including a circuit area LC, and a lower chip 60 including a memory area MC. In various example embodiments, the lower chip 60 may include a dummy area DC. Dummy cells may be provided in the dummy area DC. In some example embodiments, the upper chip 40 and the intermediate chip 50 may be stacked on each other at a wafer level, and the lower chip 60 may be attached to the bottom of the intermediate chip 50 at a chip level.

The upper chip 40 may include a sensing area SA where a plurality of pixels PX are arranged, and a first pad area PA1 around the sensing area SA. A plurality of upper pads PAD may be arranged in the first pad area PA1. The plurality of upper pads PAD may be connected to pads arranged in a second pad area PA2 of the intermediate chip 50 through vias or the like to be connected to circuits in the circuit area LC.

The intermediate chip 50 may include the circuit area LC in which analog circuits and digital circuits are arranged, and a second pad area PA2 around the circuit area LC. Circuits of the circuit area LC may include circuits for driving a pixel circuit disposed in the upper chip 40, for example, a row driver (e.g., the row driver 120 in FIG. 1), an ADC circuit (e.g., the ADC circuit 130 in FIG. 1), and a timing controller (e.g., the timing controller 150 in FIG. 1).

The lower chip 60 may include a memory area MC and a dummy area DC. In some embodiments, the dummy area DC may be omitted. Also, in some embodiments, the lower chip 60 may have a package structure. For example, each of the memory area MC and the dummy area DC may be manufactured or fabricated as a chip and sealed together with a sealing material, and thus, the lower chip 60 may have a package structure including two chips. Memory elements, such as dynamic random access memory (DRAM) elements and/or static random access memory (SRAM) elements, may be arranged in the memory area MC. However, the memory elements arranged in the memory area MC are not limited to DRAM elements or SRAM elements. Memory elements may not be arranged in the dummy area DC. The dummy area DC may have a function of supporting the intermediate chip 50 and the lower chip 60 rather than a function of storing data. The memory elements of the memory area MC may be electrically connected to at least some of the circuits of the circuit area LC of the intermediate chip 50 through bumps or through-electrodes.

Referring to FIG. 14B, an image sensor 2 according to various example embodiments may include an upper chip 70 and a lower chip 80. The upper chip 70 may include a sensing area SA in which a plurality of pixels PX are provided, a circuit area LC in which devices for driving the plurality of pixels PX are provided, and a pad area around the sensing area SA and the circuit area LC. A plurality of upper pads PAD may be arranged in the pad area PA, and the plurality of upper pads PAD may be connected to memory elements of the memory area MC provided in the lower chip 80 through vias or the like. The lower chip 80 may include a memory area MC and a dummy area DC. The lower chip 80 may be substantially the same as the lower chip 60 of the image sensor 1 of FIG. 14A. Accordingly, a detailed description of the lower chip 80 is omitted.

Figure 15:
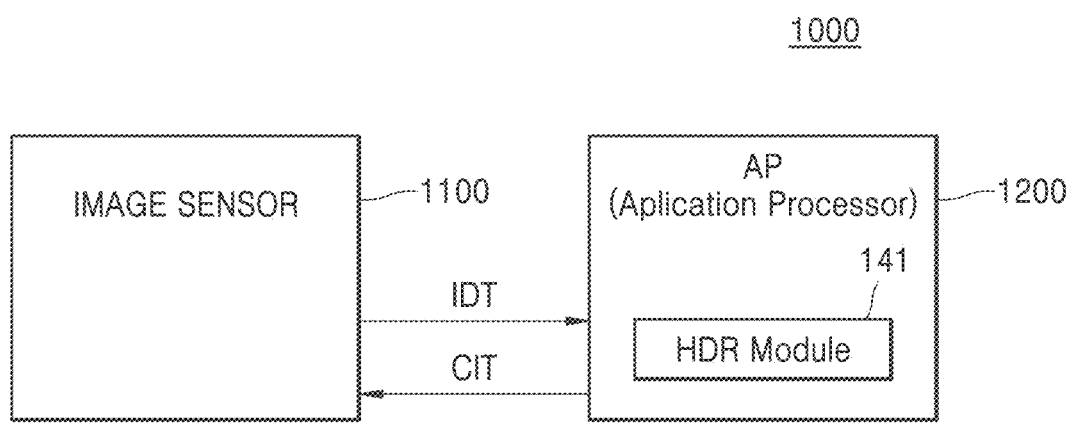
FIG. 15 is a block diagram schematically illustrating an electronic device including an image sensor according to various example embodiments.

FIG. 15 is a block diagram schematically illustrating an electronic device including an image sensor according to various example embodiments.

Referring to FIG. 15, an electronic device 1000 may include an image sensor 1100 and an application processor (AP) 1200. The electronic device 1000 may further include various sensors such as an illuminance sensor, and/or a communication module.

The application processor 1200 may provide control signals for controlling the operation of the image sensor 1100 to the image sensor 1100. The transmission of the control signals may be performed based on an interface based on, for example, I2C. The control signals may further include configuration data of the image sensor 1100, such as one or more of a lens shading correction value, a crosstalk coefficient, an analog gain, a digital gain, and a frame rate setting value.

The image sensor 1100 may generate image data IDT by capturing an image of an object based on received control signals. The image data IDT may include still images and moving images. The image sensor 1100 may perform signal processing, such as one or more of image quality compensation, binning, and downsizing, on the image data IDT, and the image quality compensation may include signal processing, such as one or more of black level compensation, lens shading compensation, crosstalk compensation, and bad pixel correction.

The image sensor 100 described with reference to FIGS. 1 to 14B may be applied as the image sensor 1100. Each of the plurality of pixels included in a pixel array (e.g., the pixel array 110 in FIG. 1) of the image sensor 1100 may include a first photodiode (e.g., a large photodiode) and a second photodiode (e.g., a small photodiode), and may operate in first and second modes (e.g., the LCG mode and the HCG mode) based on the first photodiode and operate in third and fourth modes (e.g., the SC mode and the SLOF mode) based on the second photodiode.

The first to third CDS circuits 131, 132, and 133 in FIG. 1 may read out pixels connected to two adjacent column lines, and the two column lines may share the first CDS circuit 131 that reads out a pixel signal of the LCG mode, or may share the first to third CDS circuits 131, 132, and 133.

Because one CDS circuit does not read out all pixel signals of the LCG mode, HCG mode, SC mode, and SLOF mode, but the first CDS circuit 131 reads out a pixel signal of the LCG mode, the pixel signal of the LCG mode may be read out in a complete CDS method, and thus, the SNR characteristics of the LCG mode may be improved. According to a staggered readout method, the first CDS circuit 131 may be shared by two column lines, and thus, a circuit size, that is, the layout area of CDS circuits, may be reduced compared to a case in which the first CDS circuit 131 is connected to each column line. Alternatively or additionally, when the first to third CDS circuits 131, 132, and 133 in FIG. 1 are shared by two adjacent column lines, each of the first to third CDS circuits 131, 132, and 133 operates to correspond to a certain mode and thus may be customized according to a corresponding mode, and thus, the performance of the first to third CDS circuits 131, 132, and 133 may be improved and/or the circuit size may be reduced.

The image sensor 1100 may transmit image data IDT or signal-processed image data IDT to the application processor 1200. The image sensor 1100 may transmit image data IDT including first to fourth mode images corresponding to the first to fourth modes to the application processor 1200.

The transmission of the image data IDT may be performed using, for example, a camera serial interface (CSI) based on mobile industry processor interface (MIPI), but example embodiments are not limited thereto.

The application processor 1200 may perform image processing, such as one or more of bad pixel correction, 3A adjustment (auto-focus correction, auto-white balance, and auto-exposure), noise reduction, sharpening, gamma control, remosaic, demosaic, and resolution scaling (video/preview), on the received image data IDT.

Alternatively or additionally, the application processor 1200 may generate an image having a high dynamic range by performing high dynamic range (HDR) processing on the first to fourth mode images.

According to the image sensor and the method of operating the image sensor, according to various example embodiments, in an image sensor having a pixel structure in which several photoelectric conversion elements share a driving transistor, an increase in the size of a readout circuit may be reduced or minimized, and/or a complete CDS may be supported in a low conversion gain mode. Accordingly, in the low conversion gain mode, SNR characteristics may be improved to thereby improve image quality and/or high dynamic range (HDR) performance of the image sensor.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While inventive concepts have been particularly shown and described with reference to various example embodiments thereof, it will be understood that various changes in form and details may be made therein without departing from the spirit and scope of the following claims. Furthermore example embodiments are not necessarily mutually exclusive with one another.

For example, some example embodiments may include one or more features described with reference to one or more figures, and may also include one or more other features described with reference to one or more other figures.

What is claimed is:

1. An image sensor comprising:
   a pixel array including a first pixel connected to a first column line and a second pixel connected to a second column line, each of the first pixel and the second pixel including a first photodiode (PD) and a second PD, which share a driving transistor, the first and second pixels configured to operate in a first mode and a second mode according to a conversion gain based on the respective first PD, and the first and second pixels configured to operate in a third mode and a fourth mode based on the respective second PD; and
   an analog-to-digital converter including a first correlated double sampling (CDS) circuit, a second CDS circuit, and a third CDS circuit, which are configured to read pixel signals output through the first column line and the second column line,
   wherein the first CDS circuit is configured to connect to the first column line and the second column line in a time-division manner,
   wherein the first CDS circuit is configured to read, in a first period, a first mode pixel signal of the first pixel that is output through the first column line, and is configured to read, in a second period after the first period, a first mode pixel signal of the second pixel that is output through the second column line, and
   wherein the second CDS circuit is configured to read, in the first period, a second mode pixel signal of the first pixel that is output through the first column line, and is configured to read, in the second period, a second mode pixel signal of the second pixel that is output through the second column line.

2. The image sensor of claim 1, wherein
   the first mode pixel signal includes a reset level and a signal level, and
   the first CDS circuit is configured to read the signal level after reading the reset level.

3. The image sensor of claim 1, wherein the first period includes a first sub-period, a second sub-period, a third sub-period, and a fourth sub-period, the first CDS circuit is configured to read a reset level of the first mode pixel signal in the first sub-period, the second CDS circuit is configured to read a reset level of the second mode pixel signal in the second sub-period, the second CDS circuit is configured to read a signal level of the second mode pixel signal in the third sub-period, the first CDS circuit is configured to read a signal level of the first mode pixel signal in the fourth sub-period, and a first conversion gain of the first mode is less than a second conversion gain of the second mode.

4. The image sensor of claim 1, wherein the third CDS circuit is configured to read, in the second period, a third mode pixel signal of the first pixel and a fourth mode pixel signal of the first pixel, output through the first column line.

5. The image sensor of claim 1, wherein layout areas of at least one of the first CDS circuit, the second CDS circuit, and the third CDS circuit is different from at least one other of the first CDS circuit, the second CDS circuit, and the third CDS circuit.

6. The image sensor of claim 1, wherein a first light-receiving area of the first PD is greater than a second light-receiving area of the second PD.

7. The image sensor of claim 1, wherein each of the first pixel and the second pixel further includes:
   a first transfer transistor connected to the first PD and to a first floating diffusion node (FD);
   a gain control transistor connected to the first FD and to a second FD;
   a reset transistor connected to the second FD and having one end configured to receive a first power supply voltage;
   a second transfer transistor connected to the second PD and to a third FD;
   a switching transistor connected to the second FD and to the third FD; and
   a capacitor connected to the third FD and having one end configured to receive the first power supply voltage.

8. The image sensor of claim 7, wherein the capacitor is configured to store charges overflowing from the second PD.

9. The image sensor of claim 7, wherein,
   in the first mode, the gain control transistor is configured to turn on and the switching transistor and the reset transistor are configured to turn off,
   in the second mode, the gain control transistor, the switching transistor, and the reset transistor are configured to turn off,
   in the third mode, the gain control transistor and the switching transistor are configured to turn on and the reset transistor is configured to turn off, and
   in the fourth mode, the control transistor and the switching transistor are configured to turn on and the reset transistor is configured to toggle once.

10. The image sensor of claim 1, wherein the first pixel and the second pixel are in a same column and adjacent rows.

11. The image sensor of claim 1, wherein the first pixel and the second pixel are in adjacent columns and a same row.

12. An image sensor comprising:
    a pixel array including a plurality of pixels, a plurality of row lines configured to provide control signals to the plurality of pixels, and a plurality of column lines configured to output a plurality of pixel signals generated from the plurality of pixels, each of the plurality of pixels including a first photodiode (PD) and a second PD sharing a driving transistor;
    an analog-to-digital converter configured to convert a plurality of pixel signals output through the column lines, the analog-to-digital converter including a first correlated double sampling (CDS) circuit, a second CDS circuit, and a third CDS circuit, which are configured to read pixel signals received through a first column line and through a second column line that are among the plurality of column lines; and a switching circuit configured to time-divisionally connect the first column line to the first CDS circuit and the second CDS circuit and connect the second column line to the third CDS circuit in a first period, and to time-divisionally connect the second column line to the first CDS circuit and the second CDS circuit and connect the first column line to the third CDS circuit in a second period.

13. The image sensor of claim 12, wherein each of the plurality of pixels are configured to operate in a first mode and a second mode according to a conversion gain based on the first PD and to operate in a third mode and a fourth mode according to an output order of a reset level and a signal level based on the second PD.

14. The image sensor of claim 13, wherein, in the first period, the first CDS circuit is configured to read a first mode signal of a first pixel received through the first column line, the second CDS circuit is configured to read a second mode signal of the first pixel received through the first column line, the third CDS circuit is configured to read a third mode signal and a fourth mode signal of a second pixel received through the second column line; and in the second period, the first CDS circuit is configured to read a first mode signal of a third pixel received through the second column line, the second CDS circuit is configured to read a second mode signal of the third pixel received through the second column line, and the third CDS circuit is configured to read a third mode signal and a fourth mode signal of the first pixel received through the first column line.

15. The image sensor of claim 12, wherein the first CDS circuit and the second CDS circuit are on a first side of the pixel array, the third CDS circuit is on a second side of the pixel array, and the first side and the second side are sides perpendicular to a direction in which the first column line and the second column line extend.

16. An electronic device comprising:

an image sensor configured to generate a first mode image, a second mode image, a third mode image, and a fourth mode image, each of the first mode image, the second mode image, the third mode image, and the fourth mode images configured to be generated based on one exposure; and an application processor configured to receive each of the first mode image, the second mode image, the third mode image, and the fourth mode image from the image sensor, and to generate an image having a high dynamic range by synthesizing the first mode image, the second mode image, the third mode image, and the fourth mode image, wherein the image sensor includes, a pixel array including a plurality of pixels, each of which includes a first photodiode (PD) and a second PD, which share a driving transistor, and are configured to output, as pixel signals and in a first mode and a second mode, a first mode signal and a second mode signal generated based on charges from the first PD, and to output, as pixel signals and in a third mode and a fourth mode, a third mode signal and a fourth mode signal generated based on charges from the second PD, a light-receiving area of the first PD greater than that of the second PD, and a first correlated double sampling (CDS) circuit, a second CDS circuit, and a third CDS circuit, which are configured to time-divisionally read out a first pixel connected to a first column line and a second pixel connected to a second column line, the first and second pixels among the plurality of pixels.

17. The electronic device of claim 16, wherein the first CDS circuit is configured to read, in a first period, the first mode signal of the first pixel output through the first column line, and to read, in a second period, the first mode signal of the second pixel output through the second column line, and the first mode is a low conversion gain mode.

18. The electronic device of claim 17, wherein the first mode signal includes a reset level and a signal level, and the first CDS circuit is configured to read the signal level after reading the reset level.

* * * * *